(12) United States Patent
Rieke et al.

(10) Patent No.: US 11,190,544 B2
(45) Date of Patent: Nov. 30, 2021

(54) UPDATING SECURITY CONTROLS OR POLICIES BASED ON ANALYSIS OF COLLECTED OR CREATED METADATA

(71) Applicant: Catbird Networks, Inc., Scotts Valley, CA (US)

(72) Inventors: Malcolm Rieke, Santa Cruz, CA (US); Cary Brent Townsend, Scotts Valley, CA (US); Holland Carrere Barry, Scotts Valley, CA (US)

(73) Assignee: Catbird Networks, Inc., Scotts Valley, CA (US)

( * ) Notice: Subject to any disclaimer, the term of this patent is extended or adjusted under 35 U.S.C. 154(b) by 272 days.

(21) Appl. No.: 16/212,444

(22) Filed: Dec. 6, 2018

(65) Prior Publication Data

US 2019/0182294 A1 Jun. 13, 2019

Related U.S. Application Data

(60) Provisional application No. 62/597,314, filed on Dec. 11, 2017.

(51) Int. Cl.
*H04L 29/06* (2006.01)
*G06F 16/23* (2019.01)

(52) U.S. Cl.
CPC .......... *H04L 63/20* (2013.01); *G06F 16/2379* (2019.01); *H04L 63/0263* (2013.01); *H04L 63/1433* (2013.01)

(58) Field of Classification Search
CPC . H04L 63/20; H04L 63/0263; H04L 63/1433; G06F 16/2379
See application file for complete search history.

(56) References Cited

U.S. PATENT DOCUMENTS

| | | | |
|---|---|---|---|
| 2015/0058619 A1* | 2/2015 | Sweet | H04L 9/3247 713/155 |
| 2015/0128211 A1* | 5/2015 | Kirner | H04L 63/104 726/1 |
| 2015/0269383 A1* | 9/2015 | Lang | H04L 63/20 726/1 |
| 2016/0028776 A1 | 1/2016 | Lim | |
| 2016/0034305 A1* | 2/2016 | Shear | G06F 16/248 707/722 |
| 2016/0072831 A1 | 3/2016 | Rieke | |
| 2016/0191549 A1 | 6/2016 | Nguyen et al. | |
| 2016/0294875 A1* | 10/2016 | Lian | G06F 9/45558 |
| 2017/0013001 A1 | 1/2017 | Friedman et al. | |
| 2017/0024408 A1* | 1/2017 | Foley | G06F 21/55 |

(Continued)

OTHER PUBLICATIONS

International Search Report and Written Opinion, PCT/US2018/064491, dated Mar. 25, 2019.

*Primary Examiner* — Samson B Lemma
*Assistant Examiner* — Zoha Piyadehghibi Tafaghodi
(74) *Attorney, Agent, or Firm* — Greenberg Traurig

(57) ABSTRACT

At least some embodiments of the present disclosure provide a system that can collect metadata from objects on at least one platform; evaluate, based on the collected metadata, at least one lifecycle policy to provide derived metadata; evaluate, based on the derived metadata, at least one security and analytics policy; and based on evaluation of the at least one security and analytics policy, perform at least one action on at least one first object, wherein the at least one first object is on the at least one platform.

18 Claims, 36 Drawing Sheets

(56) References Cited

U.S. PATENT DOCUMENTS

2017/0063883 A1* 3/2017 Martinez ............... H04L 63/107
2017/0230183 A1 8/2017 Sweet et al.
2017/0374032 A1* 12/2017 Woolward .......... G06F 9/45558
2017/0374101 A1* 12/2017 Woolward .......... H04L 63/0263
2018/0137139 A1* 5/2018 Bangalore ............. G06F 16/172

* cited by examiner

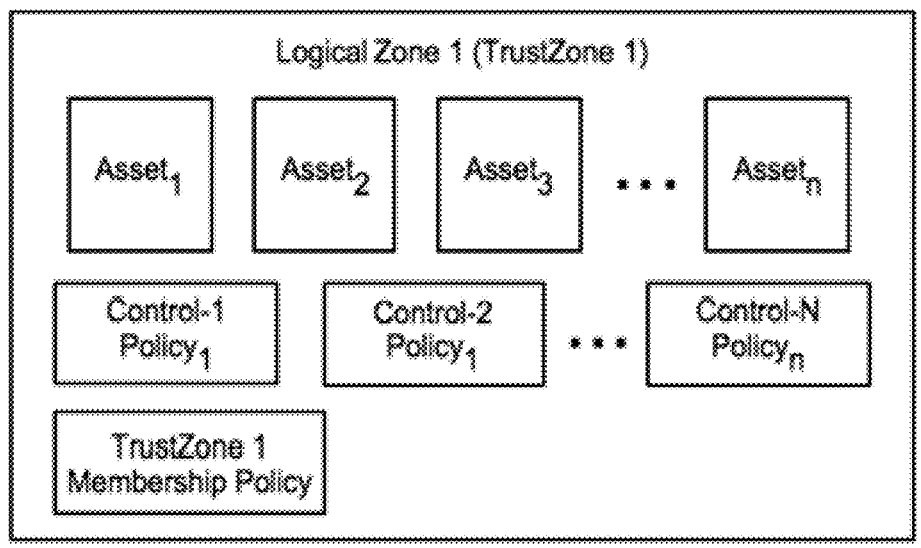
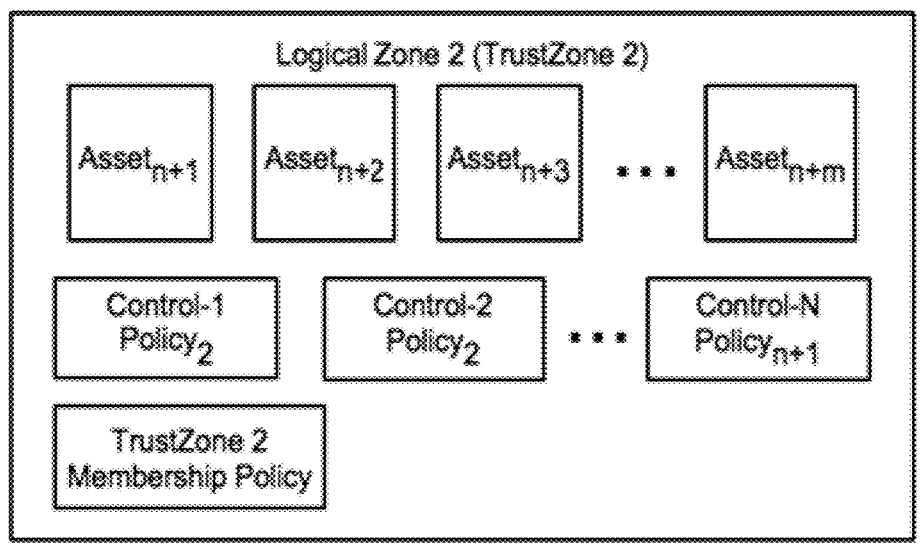
FIGURE 3

| ZACL | Network Objects | Flow Information | | | | | | | | |
|---|---|---|---|---|---|---|---|---|---|---|
| ◁ ◁ Page 1 Of 1 ▷ ▷▷ 🔄 Clear Filters | | | | | | | | | | |
| Timestamp | Type | Source Asset Name | Signature ID | Source IP | Source Port | Destination IP | Destination Port | Port Group Name | ESX Host | ZACL Rule ID |
| ▽ | ▽ | ▽ | | | | | | | | |
| 04/21/2014 16:39:31 | ZACL Allow Flow | Vma-att1-34-esx2-vSw2-2 | ZACL Rule | 192.168.9.88 | 123 | 192.168.11.225 | 123 | vSw... | esx2.catbird.local | 1 |
| 04/21/2014 16:39:31 | ZACL Allow Flow | Vma-att1-34-esx2-vSw2-2 | ZACL Rule | 192.168.9.88 | 123 | 192.168.11.225 | 123 | vSw... | esx2.catbird.local | 1 |
| 04/21/2014 16:39:31 | ZACL Allow Flow | 192.168.9.6 [VLAN 0] | ZACL Rule | 192.168.9.6 | 50431 | 192.168.9.31 | 22 | | | 1 |
| 04/21/2014 16:39:31 | ZACL Allow Flow | Vma-att1-34-esx1-vSw1-4 | ZACL Rule | 192.168.9.89 | 48223 | 192.168.9.2 | 443 | vSw... | esx1.catbird.local | 1 |
| 04/21/2014 16:39:31 | ZACL Allow Flow | 192.168.9.6 [VLAN 0] | ZACL Rule | 192.168.9.6 | 50409 | 192.168.9.31 | 22 | | | 1 |
| 04/21/2014 16:39:31 | ZACL Allow Flow | Vma-att1-34-esx1-vSw1-4 | ZACL Rule | 192.168.9.89 | 123 | 192.168.11.225 | 123 | vSw... | esx1.catbird.local | 1 |
| 04/21/2014 16:39:31 | ZACL Allow Flow | Vma-att1-34-esx2-vSw2-2 | ZACL Rule | 192.168.9.88 | 123 | 192.168.11.225 | 123 | vSw... | esx2.catbird.local | 1 |
| 04/21/2014 16:39:32 | ZACL Allow Flow | Vma-att1-34-esx1-vSw1-4 | ZACL Rule | 192.168.9.89 | 48223 | 192.168.9.2 | 443 | vSw... | esx1.catbird.local | 1 |
| 04/21/2014 16:39:32 | ZACL Allow Flow | Vma-att1-34-esx1-vSw1-4 | ZACL Rule | 192.168.9.89 | 32788 | 192.168.9.6 | 443 | vSw... | esx1.catbird.local | 1 |
| 04/21/2014 16:39:32 | ZACL Allow Flow | Vma-att1-34-esx2-vSw2-2 | ZACL Rule | 192.168.9.88 | 123 | 192.168.11.225 | 123 | vSw... | esx2.catbird.local | 1 |
| 04/21/2014 16:39:32 | ZACL Allow Flow | Vma-att1-34-esx2-vSw2-2 | ZACL Rule | 192.168.9.88 | 123 | 192.168.11.225 | 123 | vSw... | esx2.catbird.local | 1 |
| 04/21/2014 16:39:32 | ZACL Allow Flow | Vma-att1-34-esx2-vSw2-2 | ZACL Rule | 192.168.9.88 | 123 | 192.168.11.225 | 123 | vSw... | esx2.catbird.local | 1 |
| 04/21/2014 16:39:39 | ZACL Deny Flow | 192.168.9.2 [VLAN 0] | ZACL Rule | 192.168.9.2 | 54129 | 192.168.9.3 | 443 | | | 2 |
| 04/21/2014 16:39:39 | ZACL Deny Flow | 192.168.9.2 [VLAN 0] | ZACL Rule | 192.168.9.2 | 52693 | 192.168.9.3 | 443 | | | 2 |

FIGURE 11

The system collects inventory information

The system collects metadata from various sources

Metadata analytics evaluate metadata, changes in metadata, and environmental changes through events and other attributes Derived metadata may be pushed back to platforms The system interacts with controls in the environment and collects policy information Results from metadata analytics can result in modification of control policies and initiate policy changes The system collects inventory information The system collects metadata from various sources Metadata including Data and Data
Attributes is collected from
the environment The Metadata Lifecycle policy applies Metadata to the inventory Objects;
Derived metadata may be pushed back to platform The system interacts with controls in the environment and collects policy information Interaction - results from metadata analytics can result in modification of control policies and initiate policy changes Report - Under direction of the operator and in automated ways, the system generates reports in various forms including visualizations of relationships between assets based on metadata Alert - The system generates alerts based on analytics, alerts can be varying in format as appropriate for the operational environment and type/severity of alert

UPDATING SECURITY CONTROLS OR POLICIES BASED ON ANALYSIS OF COLLECTED OR CREATED METADATA

CROSS-REFERENCE TO RELATED APPLICATIONS

This application claims priority to U.S. Provisional Application Ser. No. 62/597,314, filed Dec. 11, 2017, entitled "UPDATING SECURITY CONTROLS OR POLICIES BASED ON ANALYSIS OF COLLECTED OR CREATED METADATA," by Rieke et al., the entire contents of which application is incorporated by reference as if fully set forth herein.

This application is related to U.S. Nonprovisional patent application Ser. No. 14/523,624, filed Oct. 24, 2014, by Malcolm Rieke, and entitled "SYSTEMS AND METHODS FOR NETWORK ANALYSIS AND REPORTING," the content of which is incorporated by reference in its entirety.

This application is related to U.S. Nonprovisional patent application Ser. No. 13/918,633, filed Jun. 14, 2013 and entitled "SYSTEMS AND METHODS FOR DYNAMIC NETWORK SECURITY CONTROL AND CONFIGURATION," the content of which is incorporated by reference in its entirety.

BACKGROUND

At least some exemplary embodiments described herein relate to systems and methods for network security control.

Information security architects and security operators, as well as governance, risk and compliance (GRC) personnel all face various challenges with respect to validating that security technical controls are in place and functioning for an asset or a group of assets within the corporate computing environment. Furthermore, conventional systems for network monitoring and control typically have limited or no ability to contextualize security and compliance-relevant data from various components of systems for computing, security control, and/or management. Such challenges can be particularly difficult in distributed computing, virtualized computing systems, or "cloud computing" systems, where the components and environment of such systems may change frequently and rapidly.

Additionally, conventional systems for network monitoring and control typically only use data from a single source, or only one type of data (such as network flow data), thereby excluding potential sources of important context-supporting data and providing a one-dimensional, network-protocol-centric view of information flow between networked systems.

At least some embodiments of the present disclosure help to address such challenges.

SUMMARY

Among other things, some embodiments of the present disclosure can collect and analyze asset and network data from multiple sources, and use such data to present a more complete and accurate representation of the network connections between various systems and software applications and the policies dictating the operation of security controls on a network compared to conventional systems.

Some embodiments of the present disclosure collect and/or create metadata, analyze such metadata, and then perform actions based on this analysis. The metadata may be collected, for example, from different platforms (e.g., from virtualization platforms such as VMware and OpenStack, operating systems, container systems, and cloud systems such as Amazon Web Services or Microsoft Azure). The actions performed may include, for example, updating security policies and/or controls for objects on one of more of the platforms from which data is collected. Other actions include, for example, reporting of data flows to a user and/or another computing device. The reporting may be based, for example, on analysis of the metadata.

In one embodiment, a computer-implemented method comprises: performing, by at least one computing device, at least one of collecting or creating metadata to provide derived metadata; analyzing, by the at least one computing device, the derived metadata; and based on analyzing the derived metadata, performing at least one action.

In one embodiment, a system comprises: at least one processor; and memory in communication with the at least one processor and storing instructions that, when executed by the at least one processor, cause the system to: collect metadata from objects on at least one platform; evaluate, based on the collected metadata, at least one lifecycle policy to provide derived metadata; evaluate, based on the derived metadata, at least one security and analytics policy; and based on evaluation of the at least one security and analytics policy, perform at least one action on at least one first object, wherein the at least one first object is on the at least one platform.

In one embodiment, a computer-implemented method includes collecting, by a computer system, data from a plurality of different types of sources, wherein the collected data includes network data and asset data; identifying, by the computer system based on the network data in the collected data, a network traffic event and a plurality of network assets related to the network traffic event; identifying, by the computer system based on the asset data in the collected data, connections between the plurality of network assets; generating, by the computer system, a flow information graph that depicts the plurality of network assets and the connections between the plurality of network assets, wherein the flow information graph depicts network traffic that is allowed between network assets and network traffic that is blocked between network assets; and presenting the flow information graph via a display of a user interface in communication with the computer system.

The present disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

A more complete understanding of certain embodiments may be derived by referring to the detailed description and claims when considered in connection with the following illustrative figures.

FIG. 3 depicts a logical representation of various logical zones according to various embodiments of the present disclosure.

FIG. 11 is an exemplary data table according to various aspects of the present disclosure.

DETAILED DESCRIPTION OF EXEMPLARY EMBODIMENTS

Figure 1:
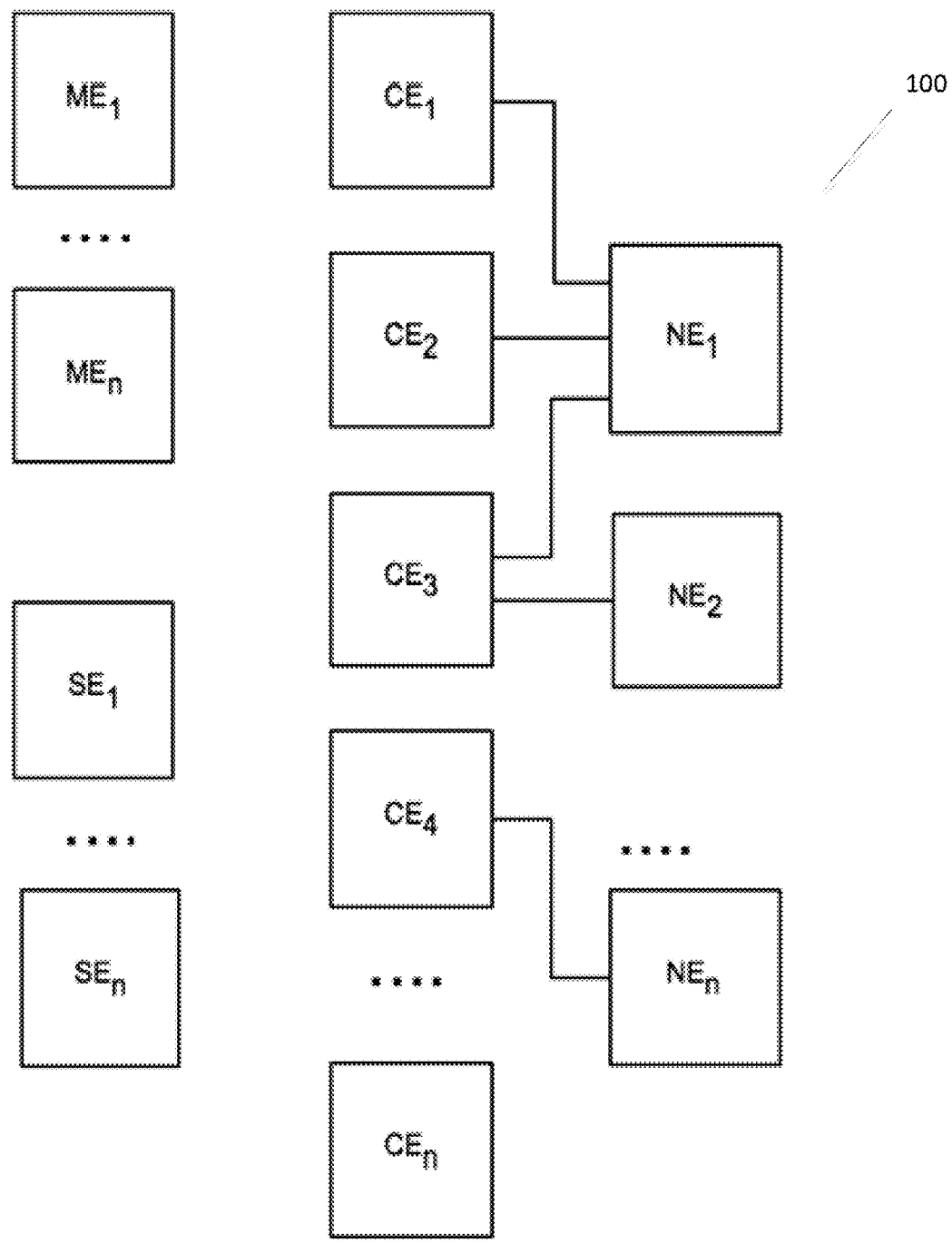
FIG. 1 depicts an exemplary computing environment that may be used in conjunction with various embodiments of the present disclosure.

Systems, methods and computer program products are provided. In the detailed description herein, references to "various embodiments", "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements including, for example, event streams such as IPFIX data feeds, data channels, direct network inspection (such as in an intrusion detection system), log feeds, log inspection, and/or programmatic interactions such as those utilizing an application programming interface. It should be noted that many alternative or additional functional relationships or physical connections may be present in a practical system.

The present disclosure may reference the following terms defined in the list below. The definitions in this list are exemplary only. Changes, modifications, and variations based on different definitions of the terms, as well as different terms, are intended to be included within the scope of the present disclosure.

Asset—a discrete hardware based on virtualized computing system that processes data in the data center, a virtualized computer or virtual machine. Assets may become a member of a TrustZone either through automated methods as expressed in membership polices or manually through a user action.

Asset attribute—a property of an asset including but not limited to any operating system configuration setting, data processing application deployed on the asset, application configuration setting, hardware based or virtualized system component including network interface, memory, disk, networking component interconnection, unique identifier, name, or any discrete data component or label associated with an asset, an asset configuration, or the asset's position within the physical or virtualized datacenter system.

Security technical control—a device, technology, software program, or a configuration or attribute of an element that performs a security function or changes the security posture or state of an element including but not limited to: firewalling, intrusion detection and prevention, vulnerability scanning, vulnerability management and mitigation, anti-malware, host based intrusion detection and prevention, file integrity monitoring, authentication-authorization-auditing, encryption in motion, encryption at rest, encryption key and token management, user entitlement management, network access control, password length specification, configuration settings that dictate the operation of a system or element in one or another context of various security levels.

Policy—a policy is a rule, set of rules, and/or a set of data used to guide the operation or behavior of a system or system component/element. Specifically a body of data associated with a security technical control that dictates the behavior and function of that control.

Logical zone—an arbitrary grouping of assets that may or may not have common attributes associated with a set of policies.

Hypervisor—a piece of computer software, firmware or hardware that creates and runs virtual machines.

Virtual Switch—a piece of software that provides for the network interconnection of virtual machines on a hypervisor.

Firewall—a software or hardware based security technical control that controls network traffic passing through it by analyzing the traffic components (packets) and making a decision to pass or block the traffic based on a set of rules.

Intrusion Prevention System (IPS)—a software or hardware based security technical control that inspects network connections for the purpose of detecting and disrupting undesirable network traffic based on signatures or behavior modeling.

Vulnerability Scanner—a software or hardware based security technical control that assesses the vulnerability state of assets on the network through the process of connecting to the asset over the network or running the asset as a process and assessing the asset based on known vulnerability signatures, vulnerability indicators, observed behaviors of the asset, programs running on the asset, and/or operational attributes of the asset.

Compliance Framework—a structured set of guidelines, processes and procedures published for the purpose of defining accordance with established regulations, specifications, or legislation.

Catbird TrustZone—a logical zoning construct consisting of collection of policies that include control configuration policies, membership policies, and a collection of methods that implement dynamic control reconfiguration in response to changes in the computing environment.

GRC—Governance Risk and Compliance, a generalize grouping of three related functions within an organization that respectively deal with corporate governance, enterprise risk management (ERM) and corporate compliance with applicable laws and regulation.

Embodiments of the present disclosure may monitor all asset attribute changes (i.e., those assets within or outside of a TrustZone), computing environment changes, network component changes, security control events, management component events, asset events, and/or network events. Such events, which may be referred to collectively as "environmental events" herein, can be monitored within the context of all control configuration policies such that any control configuration policy can be dynamically modified to assure that the control is still in effect for any asset in a respective TrustZone.

Environmental events within the context of TrustZone members and membership policy can be monitored such that different sets of security control policies may be dynamically assigned to, or changed for, any asset in a TrustZone by moving the asset from one TrustZone to another or by changing a policy or policies for a TrustZone of which that asset is a member. Such changes may be applied to multiple assets by simultaneously performing the same move action on multiple assets, particularly in the case of a TrustZone membership change.

Referring now to FIG. 1, an exemplary computing environment 100 that may operate in conjunction with embodiments of the present disclosure is depicted.

Figure 8:
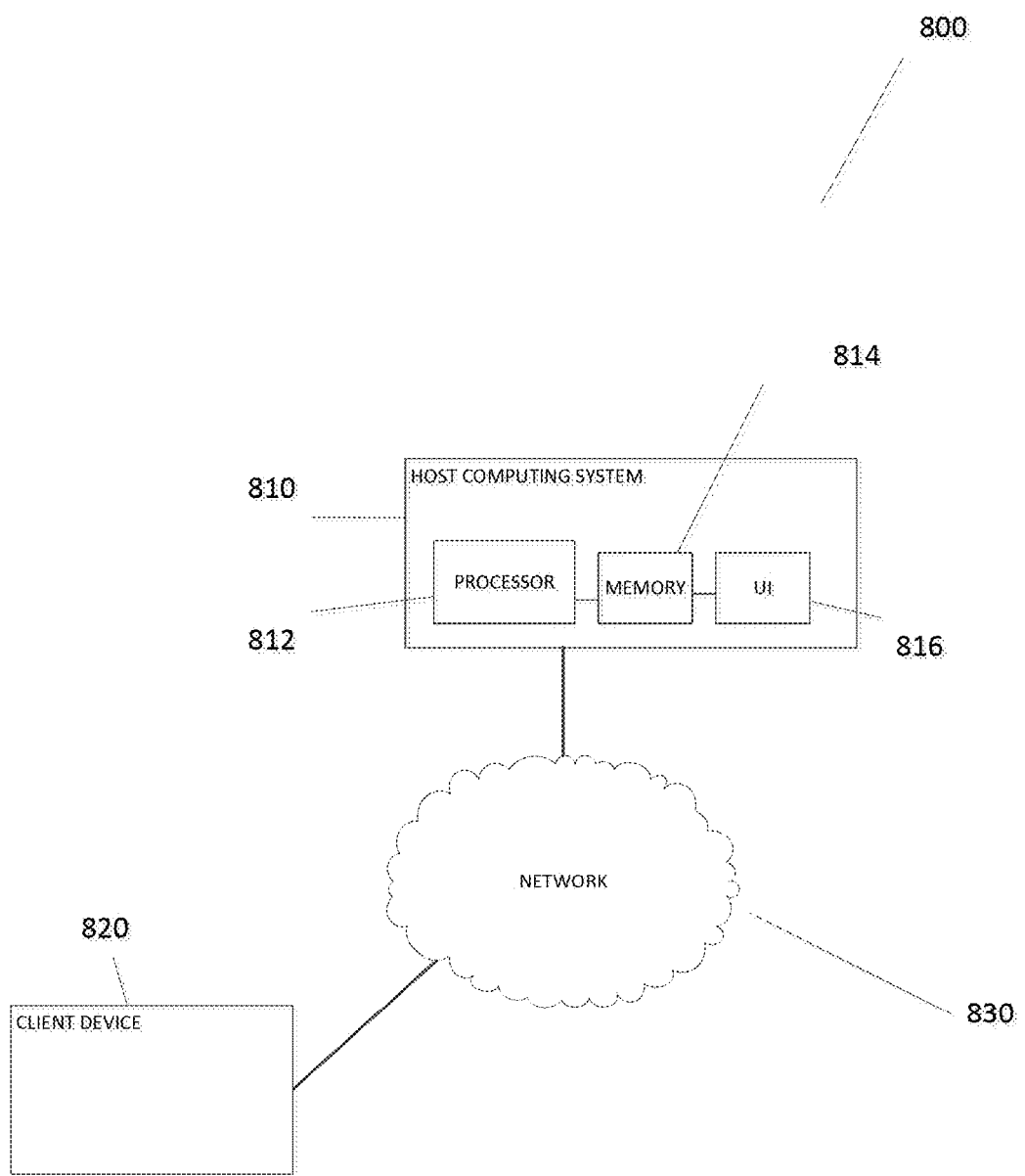
FIG. 8 is a block diagram of an exemplary system according to various aspects of the present disclosure.

The components of environment 100 may be implemented using any desired combination of hardware and software components, and may be hosted by, for example, host computing system 810 depicted in FIG. 8. Alternatively, or additionally, system 800 (or any portion thereof) may be included in environment 100. In the example shown in FIG. 1, the environment 100 includes four different types of components: computing elements (CE), networking elements (NE), management elements (ME), and security elements (SE). Embodiments of the present disclosure may interact with any number of such components, as well as other components. Each individual component may represent computers or virtual machines including any desired physical or virtualized hardware computing resources, such as processors, memories, switches, routers, load balancers, operating systems, software applications, and/or configuration elements (files, processes, policies, programs). Any element or derivative thereof depicted in FIG. 1 may be implemented using any desired combination of physical and virtual components. Virtualized elements may be bound to physical hardware using any desired hypervisor software, such as VMware ESXi, Microsoft Hyper-V, and/or OpenStack.

Computing elements are characterized by their function as application platforms dedicated to the processing of data and to providing computer services in the form of applications to a user population of various privilege levels. One example of a computing element may include a physical or virtualized Microsoft Windows server or Linux server running an application.

Network elements are characterized by their function of providing for the interconnectivity (in part or in whole) of various elements within the computing environment with networking technology and protocols and to providing for the transportation of data between computing environment elements. Examples of network elements may include routers, switches, virtualized switches, networks, VLANs, and/or software defined networking components including virtual extensible LANs (VXLANS).

Management elements are characterized by their function as hosting applications that are dedicated to the management and operation of the computing environment, the processing of data, and providing management and operational services in the form of management and operation applications to a user population of privileged administrative users. Management elements may manage other elements including computing elements, network elements or other management elements. One example of a management element may include a Microsoft Windows server running VMware vSphere Server software that is managing hypervisors in the computing environment.

Security elements are characterized by their function of providing implementations of various technical security controls either at the network, host, virtual machine, asset, program, or process level. Security elements may have hierarchical deployment architectures that include any desired number of network elements, management elements, computing elements, programs, processes, and methods implemented in a physical and/or virtualized format. Examples of security elements may include a firewall appliance and its management element or software, anti-virus software and its management and update mechanisms, a vulnerability scanner, and/or a centralized public key infrastructure utilized for access or user entitlements.

Figure 2:
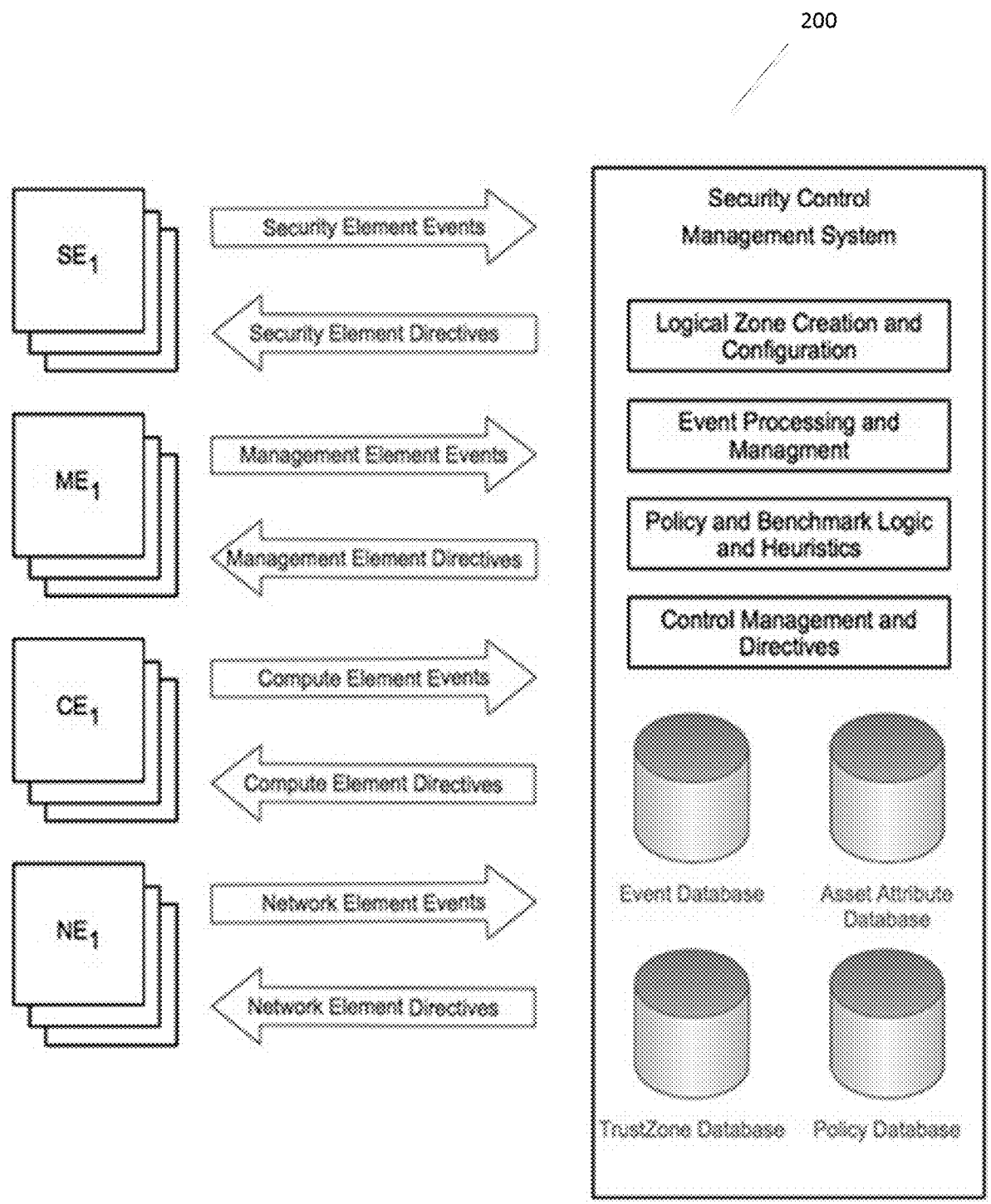
FIG. 2 depicts exemplary security control and management components according to various embodiments of the present disclosure.

FIG. 2 depicts components and programmatic inputs and outputs of a Security Control Management System (SCMS) 200 in accordance with an embodiment of the present disclosure. This embodiment may include various hardware and software components, software algorithms, data structures, and databases to implement various functions of the SCMS 200. Alternate SCMS's may have more, fewer, or different components and functionality.

In the exemplary embodiment depicted in FIG. 2, The SCMS 200 interacts with the computing environment through programmatic messaging mechanisms implemented via one or more standardized and/or proprietary interfaces or Application Programming Interfaces (APIs). The interface may utilize Secure Socket Layer (SSL) encryption, as well as any other desired encryption techniques to assure privacy and integrity of messages, events, directives and commands. Encryption techniques utilized by embodiments of the present disclosure may include mutual authentication for the sending and receiving elements. Programmatic messaging mechanisms may be implemented in any suitable manner by exemplary embodiments of the present disclosure such as via APIs, command line interface integrations, database queries, programmatic collection of display data (i.e., screen scraping), inter process communication methods, file system access, and others.

Through the programmatic messaging mechanisms, the SCMS 200 discovers information about the computing environment. Such information may include information related to individual elements, combinations of elements, or all elements. The discovered information may be used by the SCMS 200 for any desired purpose, such as to identify elements to be secured by the system and/or to heuristically determine element attributes for configuring security technical controls. The discovered information may also be used for evaluating compliance with governmental or industry regulations, security posture, security control function, security control efficacy, security control coverage, and/or security control operation.

The programmatic messaging mechanisms may include (where supported by the element or elements) the exchange between the element or elements and the SCMS 200, element related messages, logs, telemetry, configuration settings, data generated by programs or processes including or not including the SCMS 200, element attributes, data reflecting the current state and configuration of the element, and any other data relevant to the security technical controls, policies or benchmarks, either relative to the element itself or as available from the element or other elements in the computing environment, all of which may be collectively referred to herein as "events."

The programmatic messaging mechanisms may also include a command and/or configuration interface for reconfiguring the element in terms of configuration settings, policies, configuration files, the starting and stopping of element components including programs and processes, and/or to issue commands directly to the element for the purpose of changing the operational state of the element or to initiate reconfigurations performed through the same mechanism, all of which may be collectively referred to herein as "directives."

In the exemplary embodiment depicted in FIG. 2, the various components may include any desired combination of hardware and/or software components to perform various functions. For example, the Event Processing and Management component may normalize or transform such events for archiving and further processing by other components. Normalizations and transformations may include asset attribute substitution or addition through the addition of asset relevant identifiers for the purpose of associating the events with an information asset, the removal of data from the event for space reduction for archival purposes, the addition of attributes determined by the system to be relative to the originating element through events or algorithmic output from the system generated from events originating from other elements. Event processing may include extracting, from the event, streams of data and information relevant for the creation, maintenance and execution of policies, asset identification, configuration of security technical controls, and data relevant to the element and the state of the element relative to benchmarks or baselines consistent with and impacting the level of compliance with said benchmarks or baselines.

The Logical Zone Creation and Configuration performs the tasks related to TrustZone creation and configuration. This component deals with the mapping of information assets to logical zones (TrustZones) and provides the association of security technical control policies to the information asset.

The Policy and Benchmark Logic and Heuristics component performs the analysis of the policies and configurations of the security technical controls, relevant to and within the context of logical zones and the information assets within them within the context of the element events streams. This component measures data contained in events for the purpose of validating controls that are still in place and maps those control validations to various compliance frameworks such as PCI DSS 2.0, HIPAA, COBIT 4.1, DIACAP, and/or FISMA, as well as arbitrary frameworks, such as those devised at the discretion of an operator through the specification of various combinations of: policies, technical controls, asset attributes, required interactions with the SCMS verified by events, and/or attributes of elements of various types, such as those depicted in FIG. 1. This logic evaluates changes in security technical control configuration and asset attributes and performs security technical control policy reconfigurations based on those asset attribute changes for the purpose of maintaining the policy and application of the security technical controls and compliance with the benchmark. This logic evaluates various policy settings and takes the appropriate actions in response to asset attribute changes and asset TrustZone membership changes.

The Control Management and Directives component performs the construction of directives and initiates the delivery of directives to the computing environment elements to affect the appropriate action or actions from the elements including: the generation of events, transfer of configuration and process data in either direction, the starting and stopping of a security technical control, the reconfiguration of the security technical control with an updated policy, the reconfiguration of an element of any type, the starting and stopping of a program or process, the change of a configuration or attribute affecting a configuration, and the validation that the control is applied to any information asset as qualified by configuration data supplied through the events or directives.

The Event Database is a database used for the storage, retrieval, and management of events from any and all elements including the security control software itself. This database is used to store and subsequently query events for asset attribute data, security control configuration data, policy data and event data for the purposes of the various logic blocks and heuristics implemented in other components.

The Asset/Attribute Database is used for the storage, retrieval, and management of assets and asset attribute data. This database is used to store and subsequently query asset and asset attribute data for the purposes of the various logic blocks and heuristics implemented in other components.

The TrustZone Database is a database component used for the storage, retrieval, and management of logical zones (TrustZones). This component is used to store and subsequently query, update, modify TrustZones, information assets within a TrustZone, security technical control policies associated with the TrustZone for the purposes of the various logic blocks and heuristics implemented in other components.

The Policy Database is a database component used for the storage, retrieval, querying, and management of policies for the security technical controls, assets, software implementing embodiments of the present disclosure (or portions thereof), and the environment.

FIG. 3 depicts the logical representation of Logical Zones, also referred to herein as TrustZones. This configuration construct, with its associated data structures, binds assets and groups of assets through the application of policies that dictate the function and behavior of the security technical controls. TrustZones can have arbitrary numbers of assets and security technical control policies. Different security technical controls may have policy constructs that allow for hierarchical or logical inheritance from/with other policies so the depiction of a Control-N policy represents the collection of all security technical control configuration policies, files, data, configuration settings that specify the specific operation of the security technical control at any time, stored as a unit for security technical control N.

Whereas the number of control policies may be contingent on the number of supported security technical controls, new controls may be integrated with embodiments of the present disclosure as such controls are developed and become available, and can result from the combination of control functional data and events from multiple security technical controls. Accordingly, the number of control policies may vary based on the security requirements for the computing environment and the technical security controls available and configured.

TrustZone membership policies may dictate how assets are automatically placed into one or more TrustZones based on asset attributes and events originating from any element as collected by the SCMS. Each asset can be assessed, as events indicating an asset attribute has changed are received by the security control software, within the context of all TrustZone membership policies so as to affect a TrustZone membership change by moving the asset from one TrustZone to another or adding the asset to another TrustZone.

Any combination and/or subset of the elements of the methods depicted herein may be practiced in any suitable order and in conjunction with any suitable system, device, and/or process. The methods described and depicted herein can be implemented in any suitable manner, such as through security control software operating on one or more computer systems, including host system 810 depicted in FIG. 8. The security control software may comprise computer-readable instructions stored in a tangible computer-readable medium (such as the memory 814 of host computer system 810) and can be executed by one or more processors (such as processor 812 of host computer system 810) to perform the methods of various embodiments.

Figure 4:
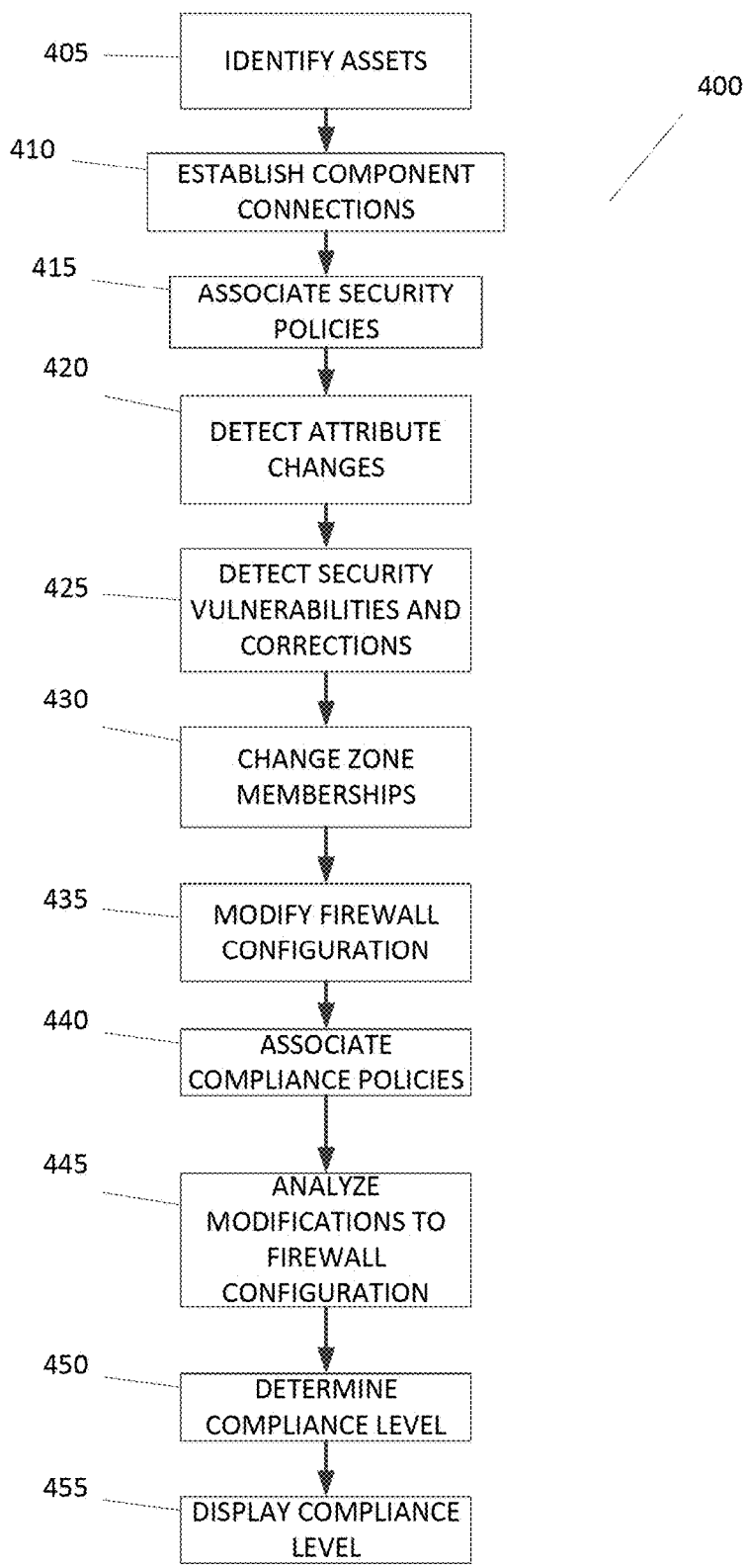
FIG. 4 is a flow diagram of an exemplary method according to various aspects of the present disclosure.

FIG. 4 depicts an exemplary process according to various embodiments of the present disclosure. In FIG. 4, method 400 includes identifying one or more assets associated with one or more logical zones (405), establishing connections with one or more components (410), associating one or more security policies with one or more logical zones (415), detecting changes in one or more attributes for one or more assets (420), detecting security vulnerabilities and corrections thereto (425), changing zone memberships for one or more assets (430), modifying one or more firewall configuration settings (435), associating one or more compliance policies with one or more logical zones (440), analyzing modifications to the firewall configuration settings (445), determining one or more compliance levels (450), and displaying one or more compliance levels (455). The steps of method 400 may be implemented (in whole or in part, and in any desired order) by software operating on a computer system, such as the exemplary host computing system 810 depicted in FIG. 8.

Embodiments of the present disclosure may identify any number of different assets (405) associated with any number of different logical zones, such as the assets in Logical Zones 1 and 2 depicted in FIG. 2. As discussed above, such assets may include any combination of physical and virtual components.

Connections may be established (410) with any number of different software and hardware components. Embodiments of the present disclosure may operate in conjunction with various programmatic messaging mechanisms that help bind the SCMS with the security technical controls within the environment. The logical zones, or TrustZones, may be created in any suitable manner, such as through interactions with logical components not depicted, policies placed on one or more logical zones that are relevant to the security technical controls bound to the SCMS.

Computing environment events may be received via programmatic messaging mechanisms that provide various information about the environment, including the assets to be protected by the security technical controls and/or the state of the security technical controls. Connections between the security control software and various components (such as management components) may be made to send and receive information, detect changes in the attributes of various assets, and to control and configure various systems, such as a firewall protecting one or more assets or logical zones.

In one embodiment, security control software implementing features of the present disclosure establishes connections via programmatic messaging mechanisms (as described above) between itself and the management element or asset management component of a virtualized infrastructure, such as a VMware vSphere server, and between itself and the management element for a virtualized firewall implemented on the same virtualized infrastructure, such as a VMware vCNS App firewall. Changes in an attribute of an asset may be detected via a communication with the management element and the security control software.

Assets, and changes in the attributes of assets, may be detected by periodically querying the management element or other hardware or software components. For example, a security technical control, referred to herein as a Virtual Infrastructure Monitor (VIM), may use the connection to the vSphere server to identify and enumerate all virtualized computing elements (i.e., virtual machines) and all virtual switches. Through the API interface with vSphere, the security control software implementing the features of the present disclosure may periodically query and re-enumerate the configured virtual machines and virtual switches, thus determining the creation of new assets (such as virtual machines and virtual switches) or changes to the attributes of existing assets by comparing the results of subsequent queries with the previous query. The attributes for a plurality of different assets controlled by an asset management component can be monitored by querying the asset management component, as well as via communications originated by the asset management component to the security control software.

The VIM is also capable of querying various virtual machine configurations and settings such as the virtual infrastructure Universally Unique Identifier (UUID) for the virtual machine, the virtual network interface cards, virtual machine interface card Internet Protocol (IP) address, current position of the virtual machine interface card within the virtual switch or switches, and many more configuration settings, which may be referred to herein collectively as "attributes of the virtual machine." Through the processing of events generated by VIM, the SCMS "incepts" each virtual machine as an information asset within the SCMS, storing the asset data including attributes in the Asset/Attribute database.

In the present exemplary embodiment, the availability of a management element that provides the API interface to enumerate assets and asset attributes makes this process programmatically simplified when the computing environment includes a predominantly virtualized infrastructure. Alternate embodiments could collect and/or create the same or similar data relative to physical computing elements through the establishment of programmatic messaging mechanisms with a variety or combination of management elements, other technical security controls (such as network scanners), and with the physical computing elements themselves. Thus, embodiments of the present disclosure may operate with any combination of physical and virtual components.

The system may instantiate another connection with the management element for the virtualized firewall (i.e., a firewall management component) implemented on the same virtualized infrastructure. This connection need not necessarily include a technical security control in of itself, but rather a programmatic interface to the firewall (a technical security control). The functionality of the firewall can be managed via a communication between the security control software and the firewall management component. In exemplary embodiments, the programmatic interface or API enables the SCMS to fully control the firewall, the firewall operation and firewall policies expressed in configuration settings and access control lists (ACLs), through a combination of issued directives and collected events to and from the firewall management element. This connection and API constitutes an orchestrated security technical control relative to the SCMS.

Various security policies may be associated with different assets and/or logical zones (415) in any suitable manner. For example, an operator of the SCMS, as well as the software control software itself, may create and configure various logical zones, and security policies for such zones, expressed as a sequence of rules. In one exemplary embodiment, the rules may have the form:
Source_TrustZoneA Destination_TrustZoneB protocol port [allow,deny]
In this example, each rule is a Zone Access Control rule, and the set of all configured Zone Access Control rules may be referred to herein as a Zone Access Control List or ZACL. In the example above, the source TrustZone is named TrustZoneA and the destination TrustZone is named TrustZoneB. By providing this abstraction, embodiments of the present disclosure help to simplify the management of what are known to practitioners of network security as Access Control Lists, which typically consist of source and destination IP addresses. While complex and disassociated asset attributes like IP address are used within conventional ACLs, in the ZACLs utilized by embodiments of the present disclosure, the source and destination are logical zones which have human readable names that are more identifiable relative to the information the assets in the ZACLs are protecting with the firewall security technical control. Referring again to FIG. 3, each TrustZone may be associated with a policy (415) for the firewall security technical control as the TrustZone is placed in the ZACL (e.g., via adding a Zone Access Control rule containing the TrustZone to the ZACL), whereby changes in the configuration to the firewall are performed in accordance with the policy. The security policy can also be edited or replaced for any TrustZone already placed in the ZACL, by for example, modifying the Zone Access Control rule.

The security control software can monitor changes (420) for all virtual machines and physical components within one or more logical zones. Event data may be analyzed and processed, and security technical controls configured or reconfigured (435) via the modification of policies. Modification of the configuration settings for the firewall may be made based on a change in a single attribute of a single asset, as well as based on an analysis of multiple attribute changes for multiple assets. For example, referring again to FIG. 3, in a case where the logical zone memberships for an asset in Logical Zone 1 and an asset in Logical Zone 2 are swapped, the security control software may analyze the change in zone membership for both assets and make a single change to the configuration settings for the firewall in accordance with the analysis. Among other things, considering multiple attribute changes (such as the swap in zone membership above) together can help embodiments of the present disclosure avoid repetitive and spurious modifications to the firewall.

Continuing with the example above, when an operator or software places an asset (Asset1) into TrustZoneA the security control software detects the change in the attributes of the asset (420), namely the change in TrustZone membership, and modifies the firewall configuration (435) accordingly. In this example, as a result of the TrustZone change, the security control software evaluates the asset attribute IP address for Asset1 and then implements an ACL on the firewall in the firewalls native form (ACL), through a formulated directive to the firewall. If a second asset (Asset2) is placed into TrustZoneB, the security control software detects the change (420), evaluates the asset attribute IP address for Asset2, and then implements an ACL on the firewall (435) in the firewall's native form (ACL) through a formulated directive to the firewall. At this point, assuming it is desired that all Transmission Control Protocol (TCP) connections between TrustZoneA and TrustZoneB be denied, the native firewall rule (ACL) may appear as:
Asset1_IP_address Asset2_IP_address TCP any deny
And the ZACL may appear as:
TrustZoneA TrustZoneB TCP any deny
For each asset added to either TrustZoneA or TrustZoneB, the system may continue building the native firewall ACL through subsequent directives, configuring the firewall automatically as the operator populates the TrustZones with assets.

Embodiments of the present disclosure may operate to detect any desired change in the attributes of an asset, such as the asset's internet protocol (IP) address. For example, if a Dynamic Host Configuration Protocol (DHCP) IP address lease expires and Asset1 receives a different IP address upon renewal of the lease; or Asset1 receives a different IP address through DHCP after being powered off for a period of time; or a hacker changes the IP address in an effort to bypass the network access controls; or an administrator accidently assigns the wrong IP address (mis-typing)—in all cases, the IP address of Asset1 changes. Because the security control software of the present disclosure is monitoring the asset attributes of all assets (e.g., through VIM), when an asset attribute change is detected (420), the security control software can formulate and send a directive (435) to modify the ACL on the firewall to reflect the new IP address.

Now consider a third TrustZone, TrustZoneC, from which the operator wants to allow all TCP connections to Trust-ZoneB. The ZACL for these policies would look like this:

TrustZoneA TrustZoneB TCP any deny
TrustZoneC TrustZoneB TCP any allow

In an example using these TrustZones, consider that, as a result of an architectural change, Asset1 (currently in TrustZoneA) now needs to be allowed to make any TCP connection to Asset2 (currently in TrustZoneB). Asset1 can be moved from TrustZoneA to TrustZoneC. The system, through it's monitoring of the asset attributes, detects the move (420) and can formulate a directive to the firewall (435) to remove Asset1's IP address from the deny ACL and add Asset1's IP address to the allow ACL. This may result in completely changing the firewall policy for both Asset1 and Asset2, and can be performed automatically, with minimal operator effort, and without the need to manipulate complex numerical ACLs on the firewall. In this manner, the configuration settings of the firewall can be modified in response to detecting the move an asset from one logical zone to another to allow or prevent communication between the moved asset and another asset or component.

Among other things, logical zoning with TrustZones helps maintain, for the security technical control firewall, the policy and the integrity of the policy when asset attributes that impact the operation of the firewall are changed for natural, accidental, or malicious reasons. Additionally, embodiments of the present disclosure are equally effective in reconfiguring the settings of a firewall when an asset (such as a physical hardware component) physically moves locations, or is simply reassigned from one logical zone to another without physically moving the asset. Furthermore, the movement of virtualized assets between the management of one management element to another management element (e.g., a vMotion event, or migration from one virtual infrastructure to another) can be tracked, as may the location of physical assets, via the connections between the security control software and various asset management components.

Embodiments of the present disclosure can move an asset (i.e., change its logical zone membership) from one TrustZone to another (430) as desired, such as when the asset attribute VM name changes. In other embodiments, different attributes or combinations of attributes for the asset, other assets, or any element could be monitored for change and affect the same TrustZone change behavior for an asset. Accordingly, as illustrated above, the firewall policy may be maintained or changed (in whole or in part) based on the nature of the attribute changes detected by the security control software implementing features of the present disclosure.

Embodiments of the present disclosure have significant utility when considering asset attributes derived from the operation of other security technical controls like a vulnerability scanner or malware detection. New vulnerabilities and viruses are constantly being discovered, so the embodiments of the disclosure can help facilitate pre-planning and pre-configuration of counter measures for these events by allowing the architect to configure TrustZones with more limited network access or no network access at all.

Referring again to FIG. 4, upon detection of a security vulnerability (such as a virus or other malware, or a defect in hardware or software) on an asset (425), security control software of the present disclosure could automatically limit or terminate network access by moving the asset (430) to a predefined TrustZone until other automated security technical controls update the vulnerability software or remove the virus. Such quarantine could be automatically removed in response to detecting the asset attribute condition that initiated the automated movement of the asset being cleared (420), or from the security control software receiving another indication that the security vulnerability has been addressed. Once the security vulnerability is addressed, the asset may be automatically moved back to the original TrustZone and the original network access policies (as expressed in the ZACL) automatically restored.

For various compliance frameworks, the security control software of the present disclosure may perform a logical mapping between the compliance controls in the framework and various security technical controls (technical controls). Administrative controls may also be mapped to the compliance controls in the frameworks, through (for example) events that are generated by the security control software and that indicate the completion of specific operator interactions with the security control software, that indicate the completion of a workflow (a process or procedure that must be completed), and/or that meets the administrative control as defined in the framework. This mapping is referred to as a compliance mapping and, in one embodiment of the disclosure, is implemented within the Policy and Benchmark Logic and Heuristics components, and the Policy Database (see FIG. 2).

Referring again to FIG. 1, one or more compliance control policies may be associated with one or more logical zones and/or assets (440). When the technical controls required by the compliance control are validated as being place for an asset in a logical zone, the security control software, using the compliance mapping, may adjust the compliance level for that compliance control accordingly.

For security technical controls, the validation of the application of the security technical control to any one asset may be performed by the security control software of the present disclosure based on the logical zoning mechanisms and membership in a TrustZone with the appropriate policies for the security technical control as described above for firewall. Any additional security technical controls may be validated as well (e.g. IPS, Vulnerability Scanner, flow auditing), such as through various interactions with the management elements for various technical controls.

For administrative controls, SCMS events that indicate that a sequence of operations invoked by the operator within the security control software's user interface have been completed validate that the administrative control has been satisfied. An example of an administrative control is the production and sharing of reports. In such an example, the operator schedules a report and designates a contact list to receive the report. Upon completion of the scheduling, an event is generated indicating the report is scheduled for delivery, thus satisfying any administrative control that requires the collaboration or sharing of information contained in any report available. Alternate embodiments could implement events for any sequence of interactions (e.g. Configuration Wizards) for any process or procedure and validate any number of processes and procedures related to the operation and configuration of the security technical controls, administrative controls, management elements, security elements, network elements, and computing elements in the computing environment, thus providing validation of compliance controls that are procedural in nature.

When adherence to a particular compliance framework is desirable, the operator can, through the Logical Zone Creation and Configuration components (see FIG. 2), select a compliance framework for any TrustZone or TrustZones. Once a compliance framework setting is applied to a TrustZone, the policies and configurations of all technical security controls and performed administrative controls are evaluated within the context of the compliance mapping for the compliance framework selected.

The security control software may analyze one or more modifications to the firewall configuration settings (445). As each control is configured, the security control software, using the compliance mapping, generates a compliance level (450) for each compliance control that is supported by the security technical controls and administrative control sequences.

Compliance mappings may combine validated technical controls where information from one technical control or policy is not sufficient to assure compliance with compliance controls. For instance, in the above example, the firewall implementation of the access control, the ACL, is only sufficient to assure the asset is protected by the firewall, when the asset attribute IP address remains the same as the one configured in the firewall ACL. Examples above demonstrate that for any asset, the attribute IP address can and will change. Through the combination of the VIM control that monitors the asset attribute changes for virtualized information assets (VMs), including asset attribute IP address changes, the compliance mapping (which combines these controls for this purpose) of the present disclosure provides more robust assertion of compliance, than conventional methods of monitoring of the firewall ACLs alone. This specific combination of the VIM control and the firewall can be generalized to any combination of VIM with any network security technical control that depends on the asset attribute IP address to function correctly. The combination of different technical and administrative security controls can be further generalized to improve the assertion of compliance controls through, for example, the use of logical zoning that allows for the application and validation of multiple security control policies in a validated manner.

Figure 5:
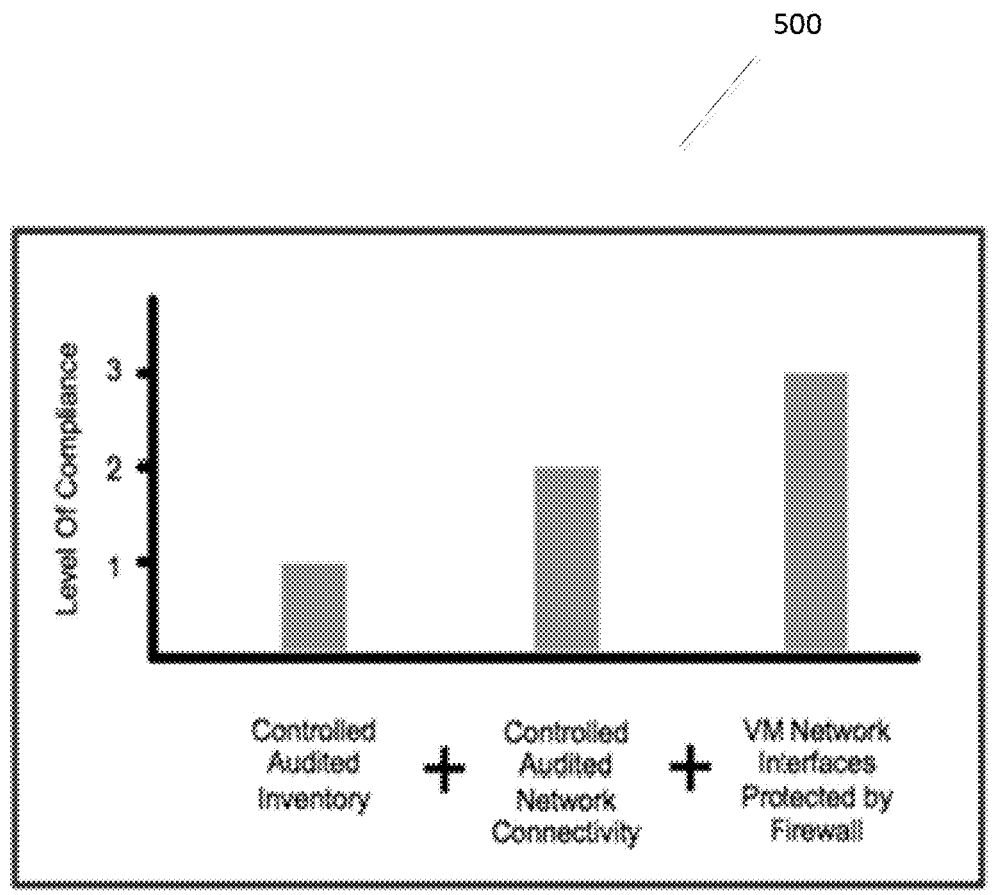
FIGS. 5-7 illustrate the calculation and display of compliance levels according to various aspects of the present disclosure.

As described above, embodiments of the present disclosure may update policies for firewalls automatically in response to IP address changes, thus maintaining compliance. This scenario illustrates why evaluating multiple technical controls may sometimes be desirable to help maintain compliance with compliance frameworks, and demonstrates the advantageous capabilities of the embodiments of the present disclosure. Although this example of combined security technical control for compliance mapping utilizes only two security technical controls, the number of security technical controls and/or events that may be combined for compliance mapping is not bounded, and combinations of arbitrary numbers may be utilized in embodiments of the present disclosure. In FIG. 5, for example, chart 500 illustrates three technical controls along the x-axis, with the contributed level of compliance to a compliance control along the y-axis.

Figure 7:
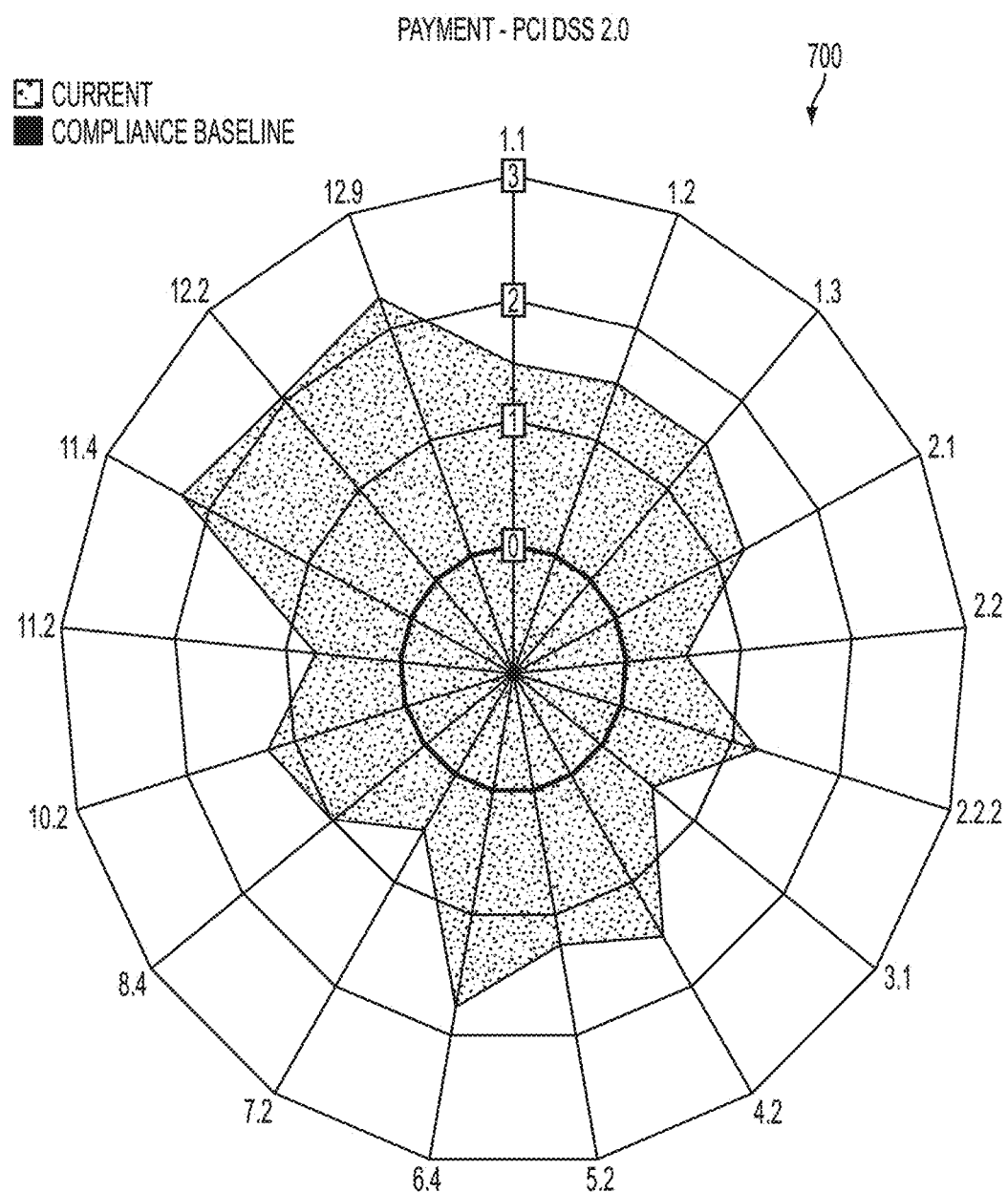

The application of firewall controls as described above may be validated by the logical zoning for any asset in a TrustZone with a ZACL listing. For any compliance control that requires the implementation of network base access controls enforced by a firewall, the security control software may utilize the instantiated compliance mapping in combination with other validated security technical controls to calculate the current compliance level for each supported compliance control. Each security technical control in a combination, as expressed in the mapping, may contribute a normalized portion of a defined compliance level measurement. These levels may be represented numerically, such as a level between 0 and 3, and that level displayed graphically (455) in real time or near-real time as shown in FIG. 7. Compliance levels (such as numerical scores) may be generated for any number of logical zones, assets, or other hardware and software components (such as the firewall) and may be simultaneously evaluated against multiple compliance frameworks through alternate compliance mappings.

Compliance frameworks are generally configured to protect data, such as cardholder data in the case of the Payment Card Industry (PCI) Data Security Standard. Generally, the number of individual elements in the computing environment that process data subject to any compliance framework is greater than one and is typically many. The sum total of all elements or assets that process the data subject to a compliance framework is referred to as the compliance scope. The compliance level of the computing environment, relevant to any framework, may only be as high as the level measured on the least compliance asset within the compliance scope. Logical zoning supports the inclusion of multiple information assets in any TrustZone. For any TrustZone with a compliance framework set, the security control software measures the compliance level for all supported compliance controls, for every asset within the TrustZone. The aggregate TrustZone level of compliance as displayed for any compliance control is calculated as the lowest measured compliance level for all assets within the TrustZone.

Figure 6:
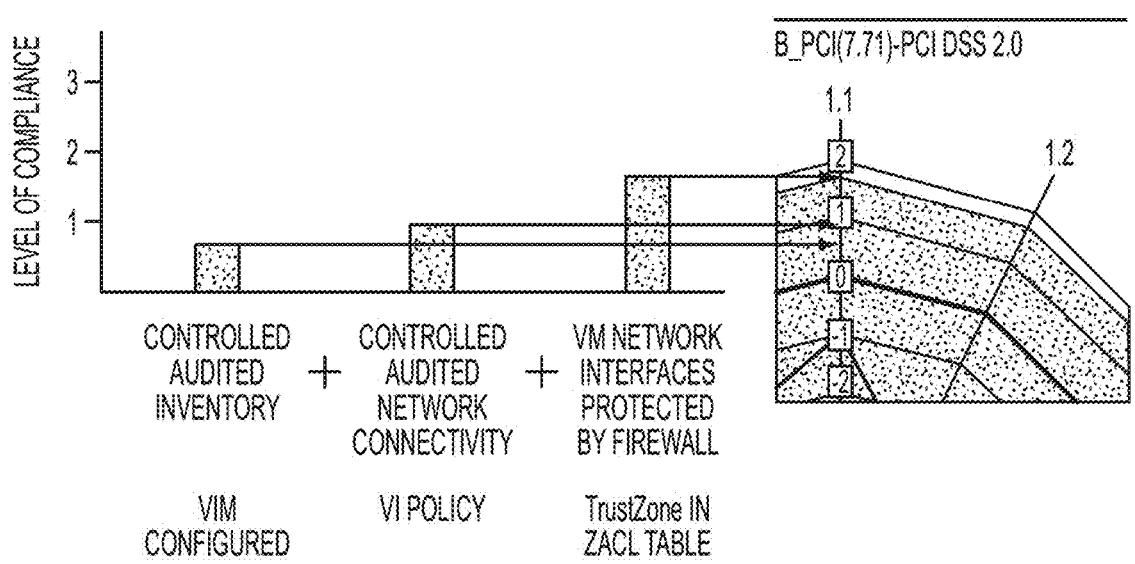

FIGS. 6 and 7 illustrate how an exemplary embodiment of the present disclosure, using a radial chart format, displays the compliance level for multiple compliance controls (455). In this example, the chart displays compliance for the PCI DSS 2.0 framework, but compliance levels may be graphically depicted for any number of different compliance standards in the same or different graphs.

With the radial chart 700 in FIG. 7, the aggregate compliance level for all compliance controls is displayed for all assets in a TrustZone named "Payment" based on calculation method described above. For each compliance control, the calculated compliance level is displayed as a radial element of the radial chart and is identified with the section number from the compliance framework.

Embodiments of the present disclosure may contain multiple compliance mappings for which the compliance levels for each TrustZone are calculated and displayed based on the specific and unique compliance framework set for that TrustZone. For example, a computing environment may contain data subject to multiple compliance frameworks. Among other things, logical zoning with TrustZones allows for the grouping of assets based on these compliance frameworks and the reporting of the compliance levels for those specific and distinct frameworks simultaneously, including the ability to measure compliance levels for an asset within the context of multiple compliance frameworks through the process of adding that asset to multiple TrustZones with different compliance framework settings.

FIG. 8 shows a block diagram of system which may be used in conjunction with various embodiments. While FIG. 8 illustrates various components of a computer system, it is not intended to represent any particular architecture or manner of interconnecting the components. Other systems that have fewer or more components may also be used.

In FIG. 8, the system 800 includes a host computer system 810 comprising a processor 812, memory 814, and user interface 816. Host computer system 810 may include any number of different processors, memory components, and user interface components, and may interact with any other desired systems and devices in conjunction with embodiments of the present disclosure.

Figure 9:
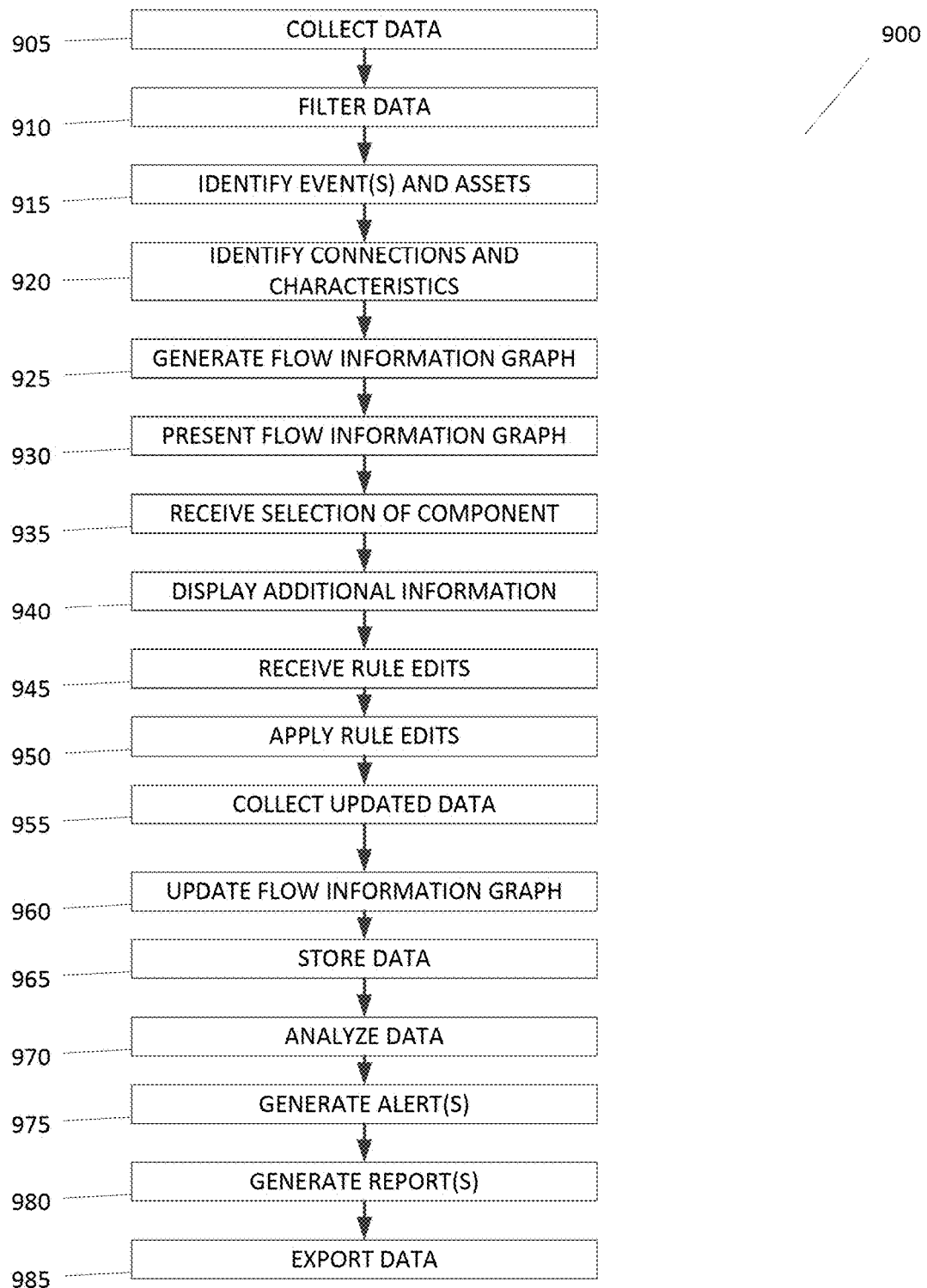
FIG. 9 is a flow diagram of an exemplary method according to various aspects of the present disclosure.

The functionality of the host system 810, including the methods depicted in FIGS. 4 and 9, (in whole or in part), may be implemented through the processor 812 executing computer-readable instructions stored in the memory 814 of the system 810. The memory 814 may store any computer-readable instructions and data, including software applications and embedded operating code.

The functionality of the host system 810 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 812 retrieves and executes instructions stored in the memory 814 to control the operation of the system 810. Any type of processor, such as an integrated circuit microprocessor, microcontroller, and/or digital signal processor (DSP), can be used in conjunction with embodiments of the present disclosure. A memory 814 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 814 in any desired manner.

The host system 810 includes a user interface 816 may include any number of input devices (not shown) to receive commands, data, and other suitable input from a user, as well as any number of output devices (not shown) to provides the user with data, notifications, and other suitable information. Typical I/O devices may include mice, keyboards, modems, network interfaces, printers, scanners, video cameras and other devices.

The host system 810 may communicate with one or more client devices 820 and other systems and devices in any desired manner, including via network 830. The client device 820 may include any computing device that operates in conjunction with systems and methods of the present disclosure. The client device 820 may be, or include, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device.

The network 8300 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

Systems and Methods for Network Flow Analysis and Reporting

Many conventional systems for network monitoring, network control, and network security typically use network flow data from routers, switches, or other hardware configured to collect network traffic statistics using a standard known as "IP Flow Information Export" (IPFIX), which is also known as "Netflow." IPFIX allows for the monitoring (e.g., auditing) of network exchanges between assets and, to some degree, qualifies information exchanges based on network connection attributes, such as IP address, source and destination port numbers, as well as byte count and other packet or connection attributes defined in the IPFIX protocol and implemented by the IPFIX sending device or software. However, conventional systems may not be capable of contextualizing the network connections represented with IPFIX with data from other sources, such as data from an intrusion detection system (IDS), intrusion prevention system (IPS), vulnerability scan data, configuration data, antivirus/anti-malware data, policies applied to security technical controls, operating system configuration data, application configuration data, processes running on the asset (application or operating system processes), process initiating user identification, binary digital signatures, and/or data from firewalls.

Additionally, conventional systems may not be able to correlate and provide contexts and causal or resultant relationships between these data elements and the actions performed in the computing environment by their perspective generating components. Embodiments of the present disclosure, by contrast, can collect and analyze asset and network data from multiple sources, and use such data to present a more complete and accurate representation of security posture and security relevant phenomena compared to conventional systems by, for example, supporting and performing complex combinatoric analyses for the correlation of events, network connections, asset operational states, and the states of security technical controls.

FIG. 9 depicts an exemplary process according to various embodiments of the present disclosure. Any combination and/or subset of the elements of the method in FIG. 9 may be practiced in any suitable order and in conjunction with any suitable system, device, and/or process, including the process shown in FIG. 4 and the system shown in FIG. 8. In FIG. 9, method 900 includes collecting data (e.g., asset and/or network data) from different sources (905), filtering the data (910), identifying one or more events and assets associated with such events from the data (915), identifying connections between assets and characteristics thereof from the data (920), and generating (925) and presenting (930) a flow information graph. Method 900 further includes receiving a selection of a component in the flow information graph (935), displaying additional information in response to the selection (940), receiving edits to network traffic rules (945) and applying such rules to the network (950). Method 900 additionally includes collecting updated data (955) and updating the flow information graph with the updated data (960). Method 900 also includes storing data (965), analyzing data (970), generating one or more alerts (975), generating one or more reports (980), and exporting data (985).

Embodiments of the present disclosure may collect data (905) from any number of different sources and/or different types of sources, including data regarding asset, network events, and system operation attributes. Such collected data may include, for example, network flow attributes, information on a user of an asset, information regarding an asset as well as hardware and/or virtual components associated with an asset, information on software applications, attributes of different network nodes, security vulnerabilities, attributes of a network of assets, information on the content of data packets, as well as any other desired information. In one example, a system implementing method 900 may collect network flow data (e.g., information pertaining to message exchanges and attempted message exchanges) between virtual and physical assets in a network from hardware components (such as routers and switches or their virtual analogues) collecting "Netflow" data. Additionally or alternatively, data may be collected from one or more other sources, such as an intrusion detection system (IDS), an intrusion prevention system (IPS), and/or a firewall. Data that is collected may also include security technical control configuration attributes or policies defining allowed and blocked traffic between specific assets, groups of assets, and/or logical zones. In some embodiments, a list of allowed and blocked traffic may be defined for various logical zones, and may be referred to herein as a "zone access control list" (ZACL).

Data may be received or collected (905) in any suitable manner, such as by polling and/or receiving data streams (as in IPFIX streams, system logs, APIs, etc.). Data can be collected from multiple sources, normalized and combined into a list of records for the purpose of associating all "attributes" with network flow data, thus allowing the embodiments of the disclosure to create and present correlations in various methods including graphs as described further herein.

Data collected from different sources may be filtered (910) in a variety of ways. For example, data from different sources may be used to populate a data structure, with data that is redundant to data from another source removed so as to produce a data structure with unique network flow attributes and characteristics collected from the different sources. Vulnerability data received from a scan can be associated (e.g., through the normalization and correlation processes described herein) with a specific network flow, thereby allowing the user of a system to identify relationships between various asset operational states and network connections from or to the asset or a plurality of assets. The collected data may also be filtered according to user preference. For example, user may be interested in a particular network event (such as a security breach) and thus the system implementing method 900 may automatically (or in response to specific user input) filter out data unrelated to a specific breached asset or compromised application service running on one or more assets.

Embodiments of the present application can identify various network traffic events, and network assets related to such events, based on the collected data (910). An event may include, for example, the exchange of data packets between two assets in a network, an attempted or actual security breach, a software update, a failure (e.g., hardware and/or software) associated with an asset, as well as other events.

An event may be defined over one or more periods of time, and embodiments of the present disclosure may operate on data received in real-time (or near-real-time) or on data previously recorded and stored. For example, a user of a financial network may wish to review network traffic between four specific network assets recorded over a three-hour period to investigate a possible wire fraud attempt. In this example, a system implementing the present disclosure may retrieve the network data for the defined time period, filter out data unrelated to the four assets or the three-hour window, and automatically identify events and assets associated with the potential fraud.

Embodiments of the present disclosure are likewise able to identify various connections between assets (920), as well as characteristics of such connections and assets. For example, data collected by the system (905) may be used to identify: data regarding one or more assets, data regarding one or more network events, and/or data regarding one or more system operational attributes. The characteristics of assets and/or the connections between assets may be defined or limited based on the filtering of the collected data (910). Characteristics of connections between assets may include, for example, the size of data communicated, times when data is communicated, the source(s) and destination(s) of data, the rate at which data is communicated, and other characteristics.

Figure 10:
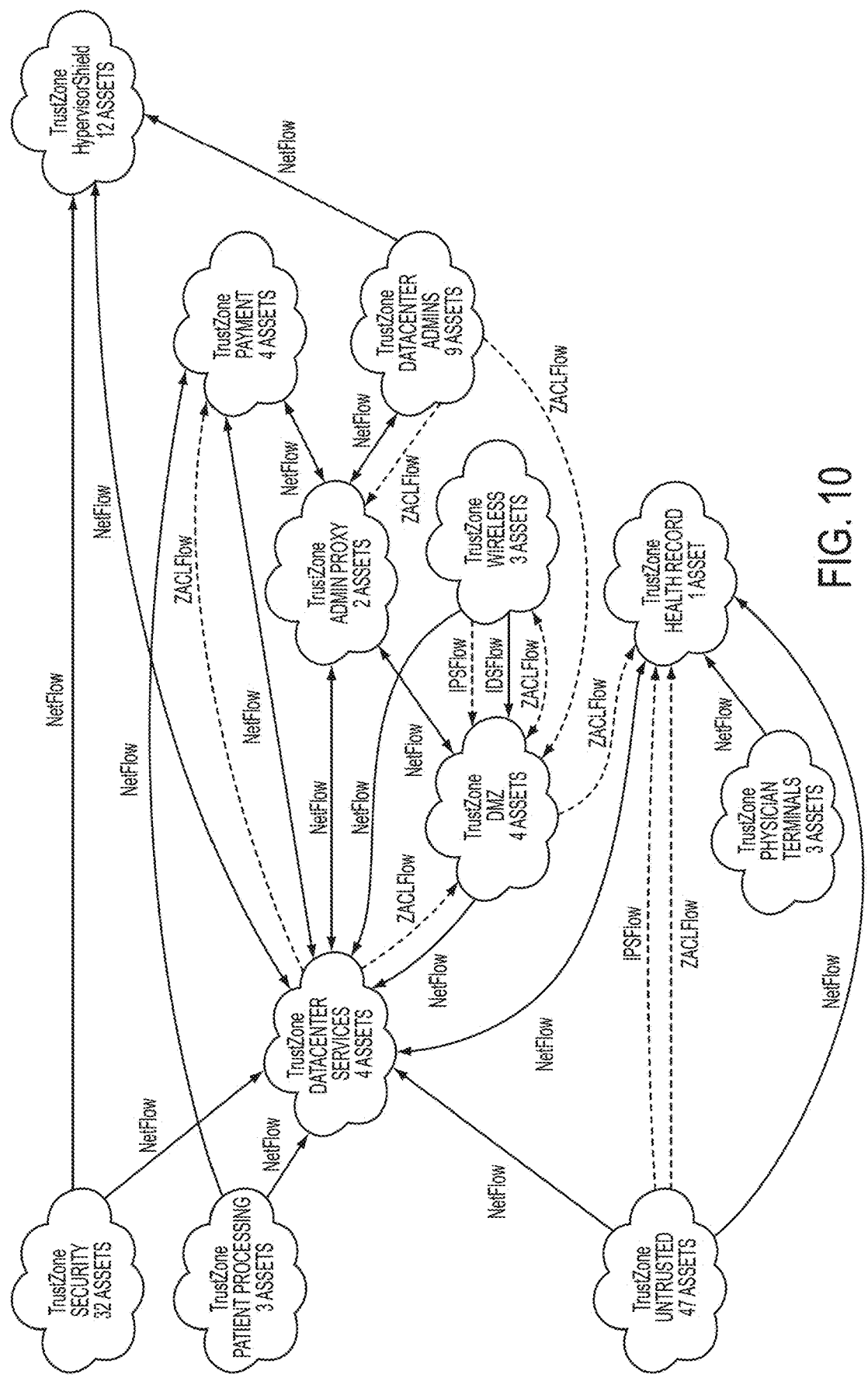
FIG. 10 is an exemplary flow information graph according to various aspects of the present disclosure.

In exemplary method 900, a flow information graph is generated (925) to visually show various network assets and the connections between such assets. The flow information graph is then presented (930) to a user, such as via a user interface display of a client device operated by the user (e.g., client device 820 in FIG. 8). FIG. 10 illustrates an example of a flow information graph. In this example, network traffic between multiple TrustZone assets is shown via selectable directional flow lines. The flow information graph depicts network traffic that is allowed between network assets (i.e., via the solid flow lines) and traffic that is blocked (i.e., via the dashed flow lines). Additionally, each flow line is labeled to indicate the type of the source of the data used to identify the connection (i.e., "Netflow," "IDS Flow," "IPS Flow," "ZACL Allowed," and "ZACL Denied").

A selection of a component (e.g., a network asset or connection between assets) may be received (935) from a user. For example, in a case where the flow information graph is presented on a display screen of client device 820 controlled by a user, the user can select (e.g., using a mouse) a flow line to perform various actions. For example, selection of the flow line may display additional information associated with the connection (940), such as by presenting the user with characteristics (e.g., identified in step 920) of the connection associated with the flow line. Selection of the flow line may also allow the user to view and edit (945) rules for allowing and blocking traffic over the connection. Rules edited in this manner can then be applied to the connection (950).

The flow information graph may be presented in conjunction with network flow information, rules, and other data, in a table format, an example of which is depicted in FIG. 11. Among other things, the table in FIG. 11 allows a user to search and/or filter the data in the table using different fields (such as based on timestamp, source asset name, or other attribute) and to create and edit rules by, for example, double-clicking an entry on the table.

Figure 12:
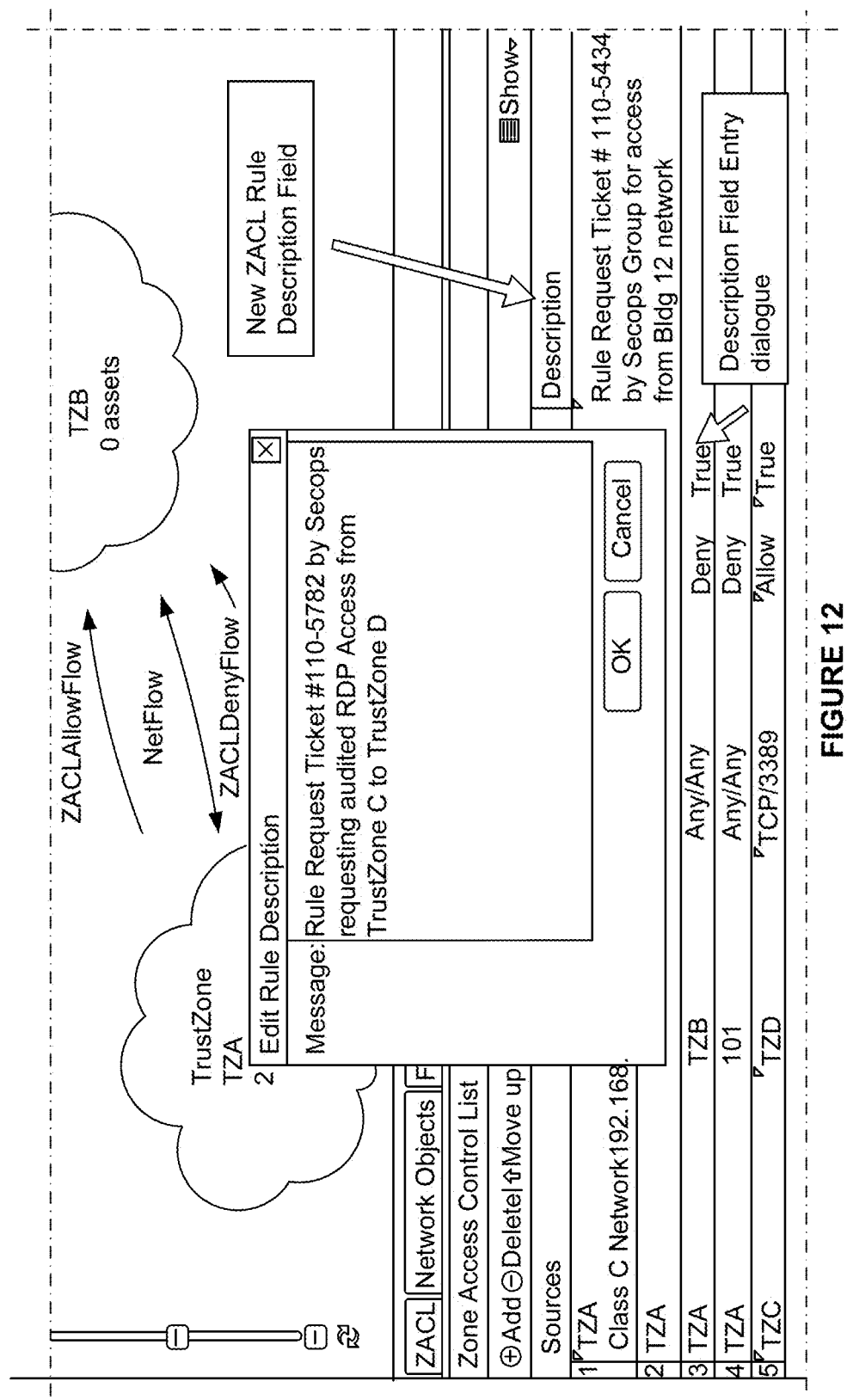
FIGS. 12-24 are screenshots showing examples of interaction with a flow information graph and data table according to various aspects of the present disclosure.

FIG. 12 illustrates an exemplary screenshot showing a ZACL rule description field that may be presented in a data table (such as the data table in FIG. 11) as well as in response to selection of a component in the flow information graph by a user. As shown, the "description field entry dialogue" can be used by a user to edit a rule to be applied to a connection between assets.

Figure 13:
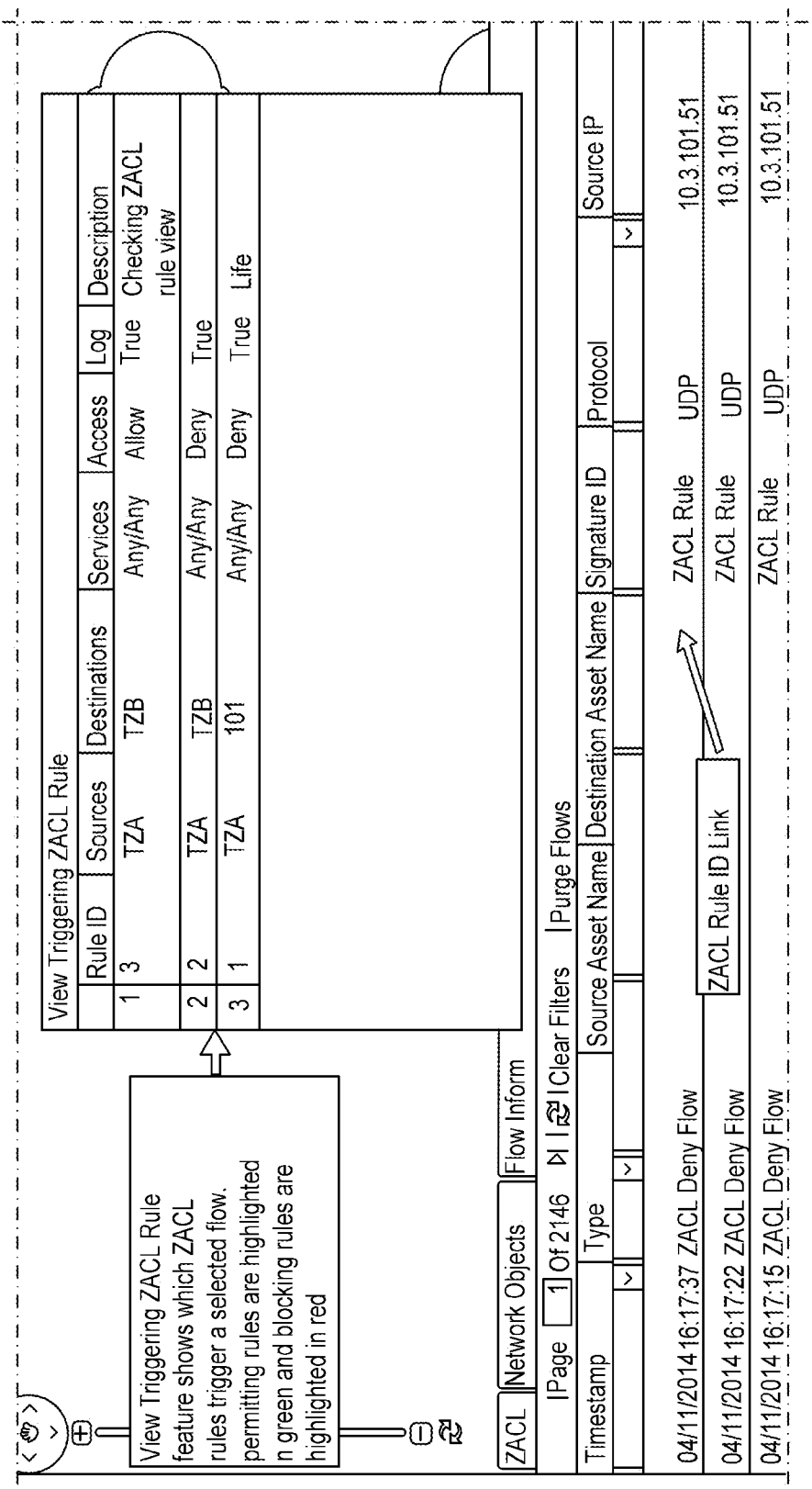

FIG. 13 illustrates another exemplary screenshot showing ZACL rules being triggered. In this example, events where traffic is allowed by a ZACL rule cause the rule to be highlighted in green, while events where traffic is blocked cause the ZACL rule to be highlighted in red. Other visual indicators for showing allowed/blocked traffic may also be used.

Figure 14:
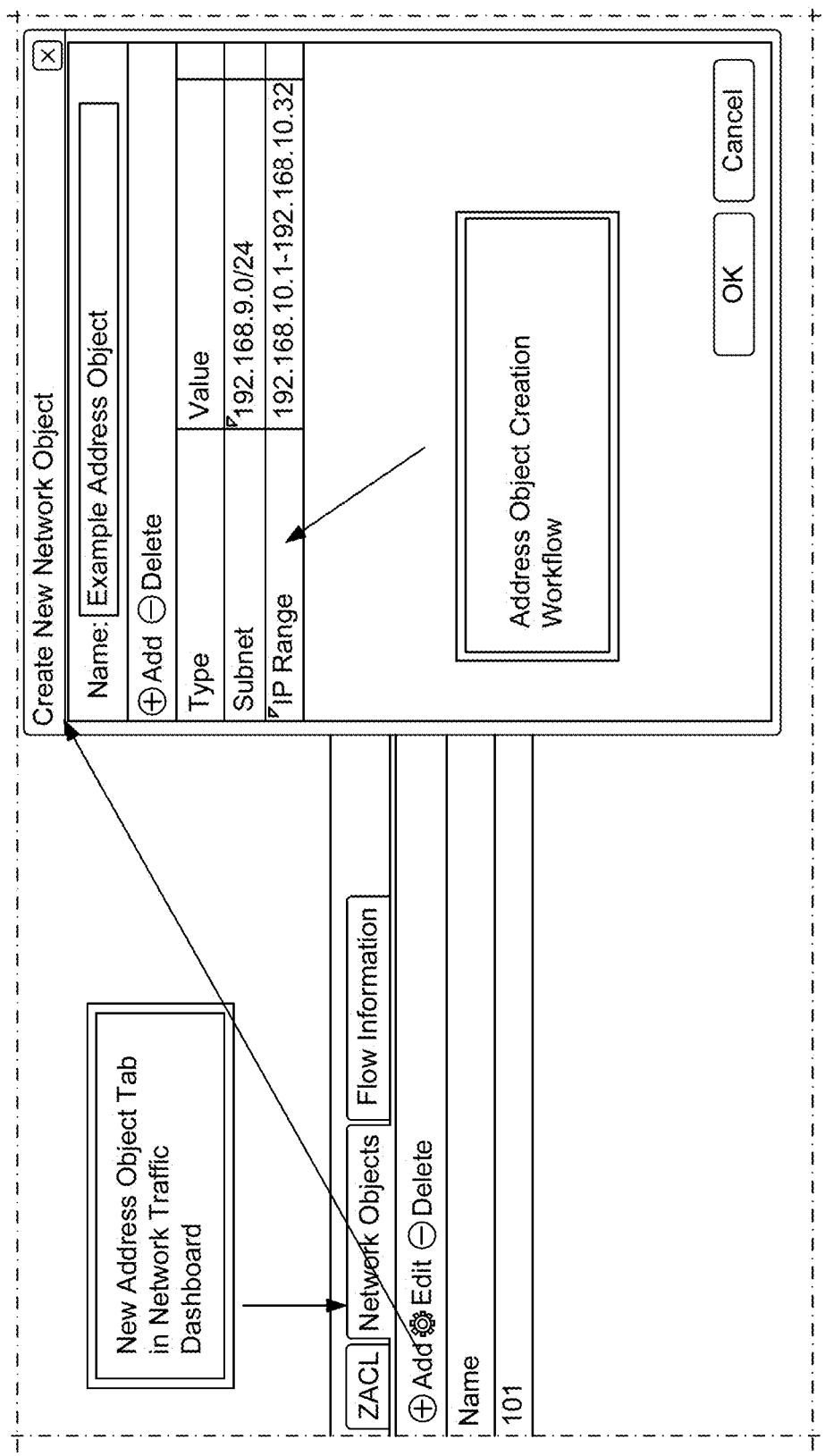
Figure 15:
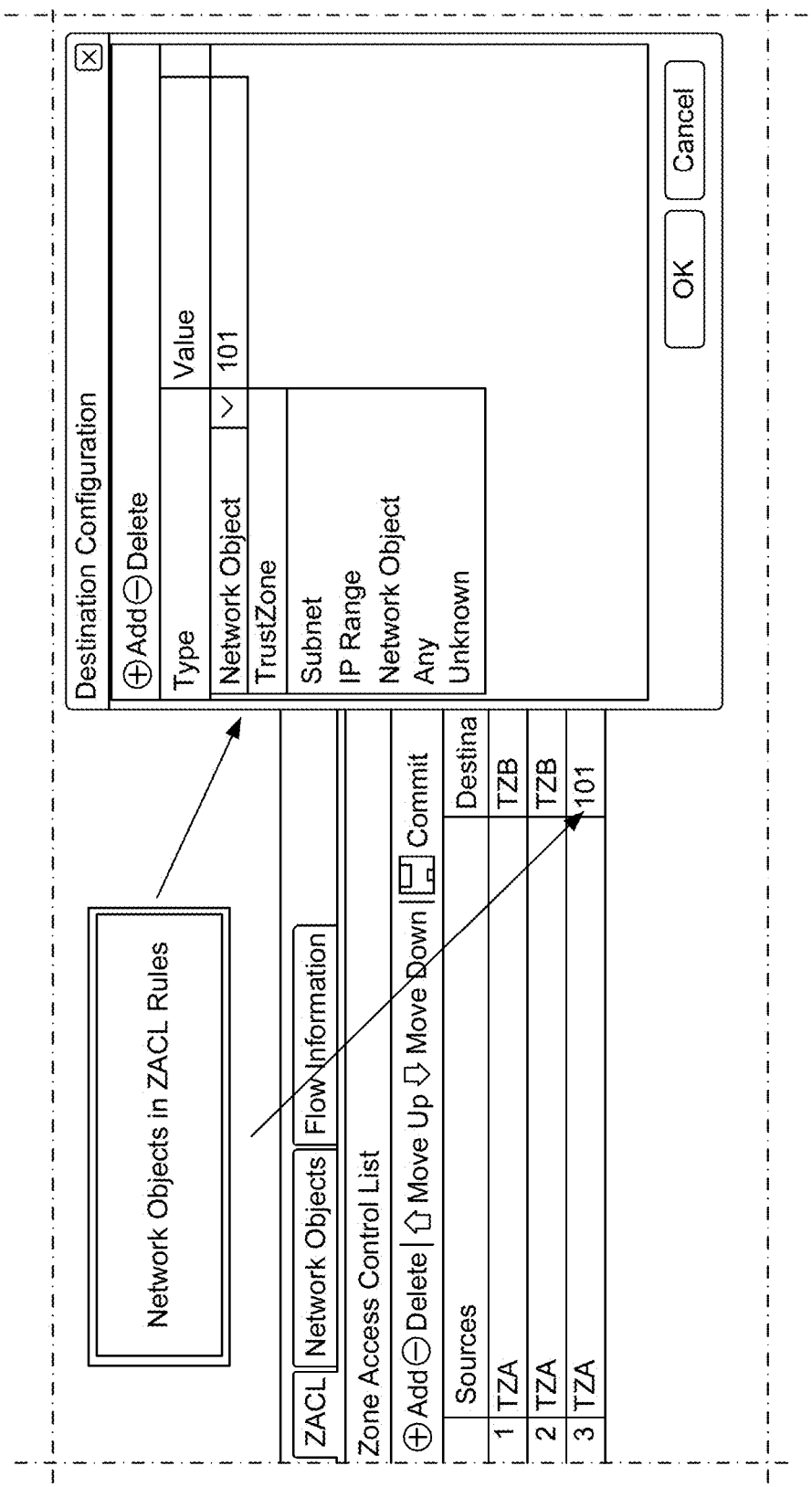
Figure 16:
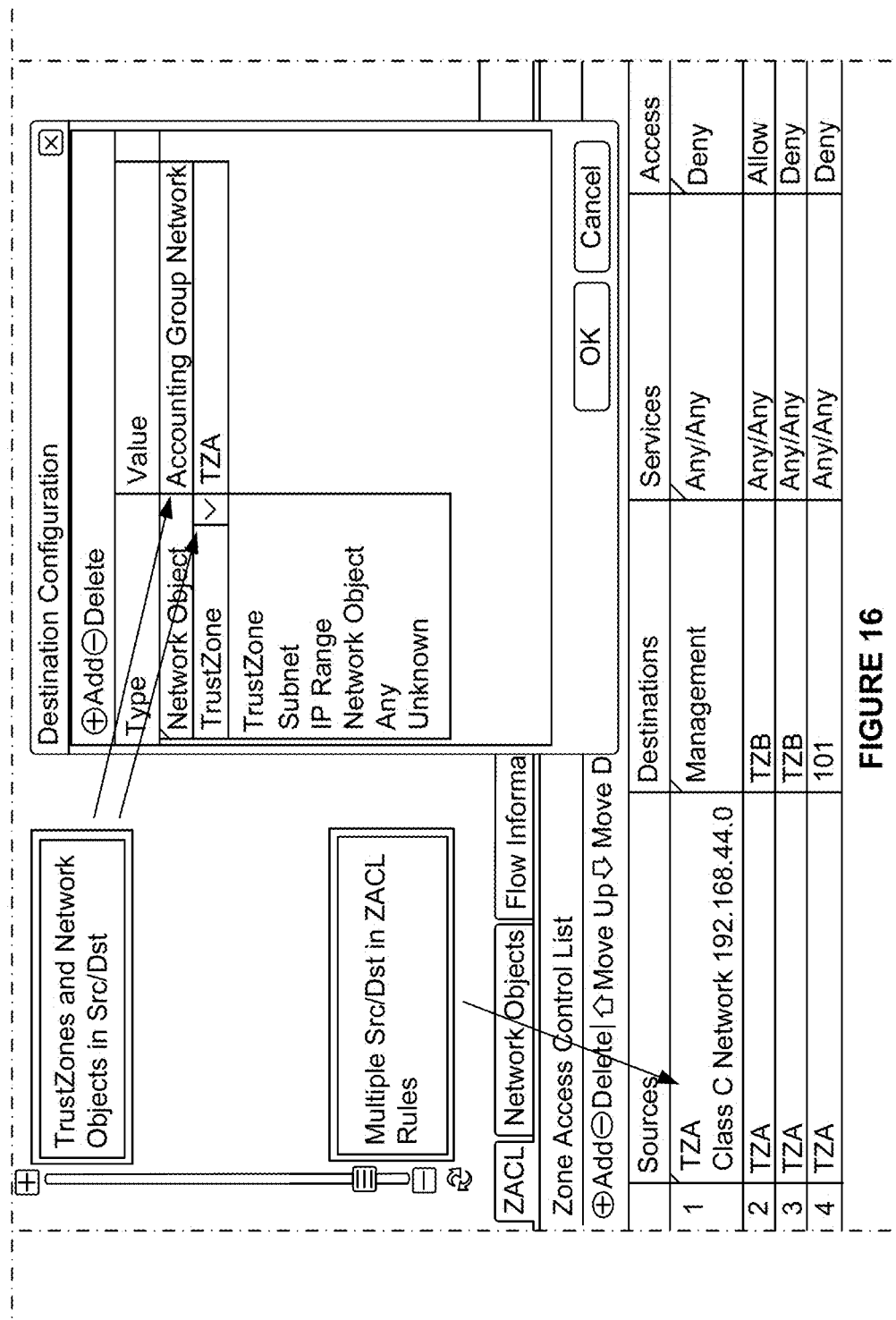

FIGS. 14 and 15 illustrate the creation of network objects (FIG. 14) and the use of network object in ZACL rules (FIG. 15). FIG. 16 illustrates a ZACL rule having multiple sources and destinations.

Figure 17:
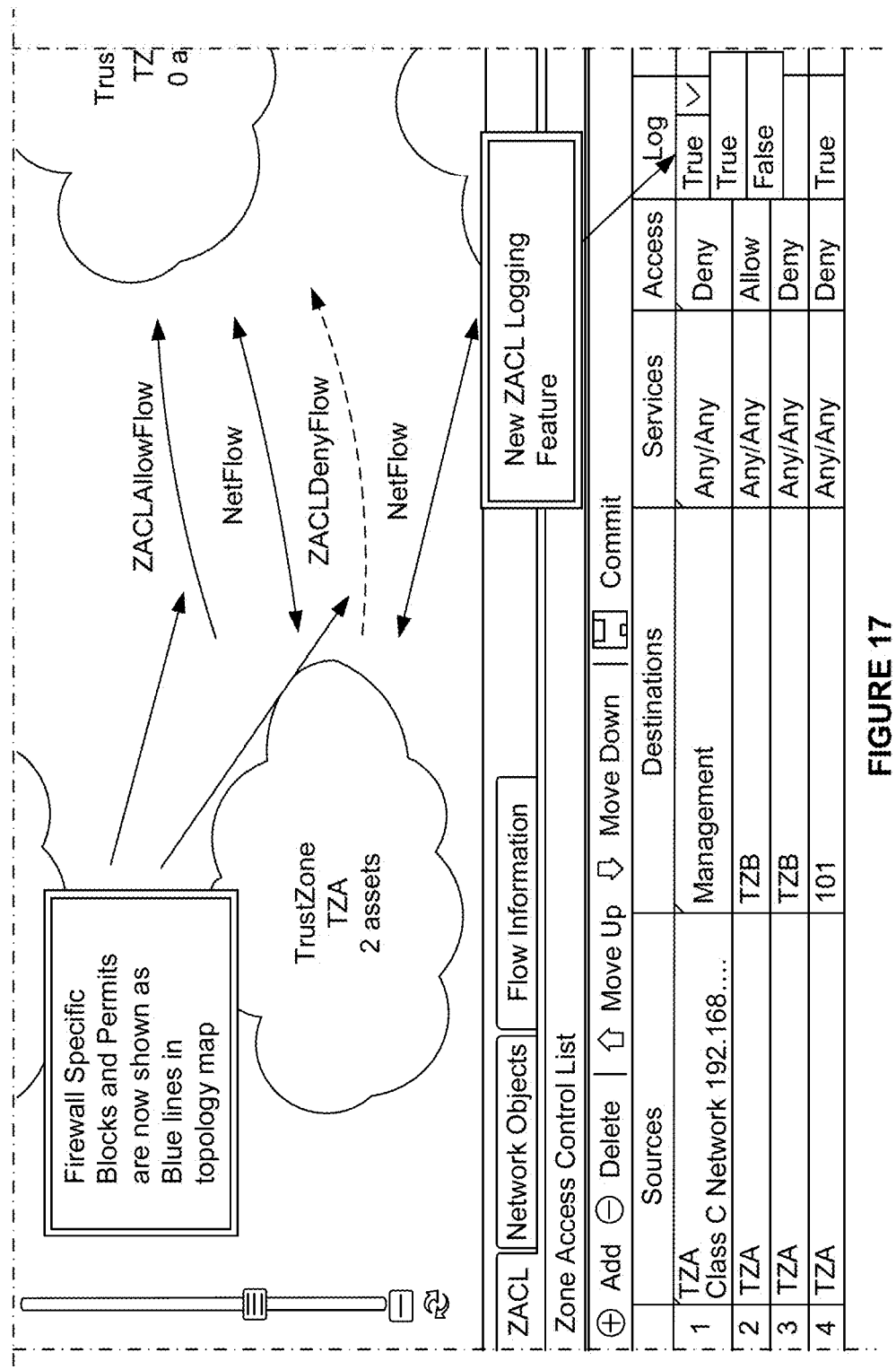

FIG. 17 illustrates blocked and allowed traffic via solid and dashed lines (respectively) on the flow information graph, as well as a pulldown on a data table associated with the flow information graph allowing the user to select "ZACL logging." Selection or de-selection of logging within a ZACL rule allows a user to include or remove (respectively) rule hits from the rule on the flow information graph.

Figure 18:
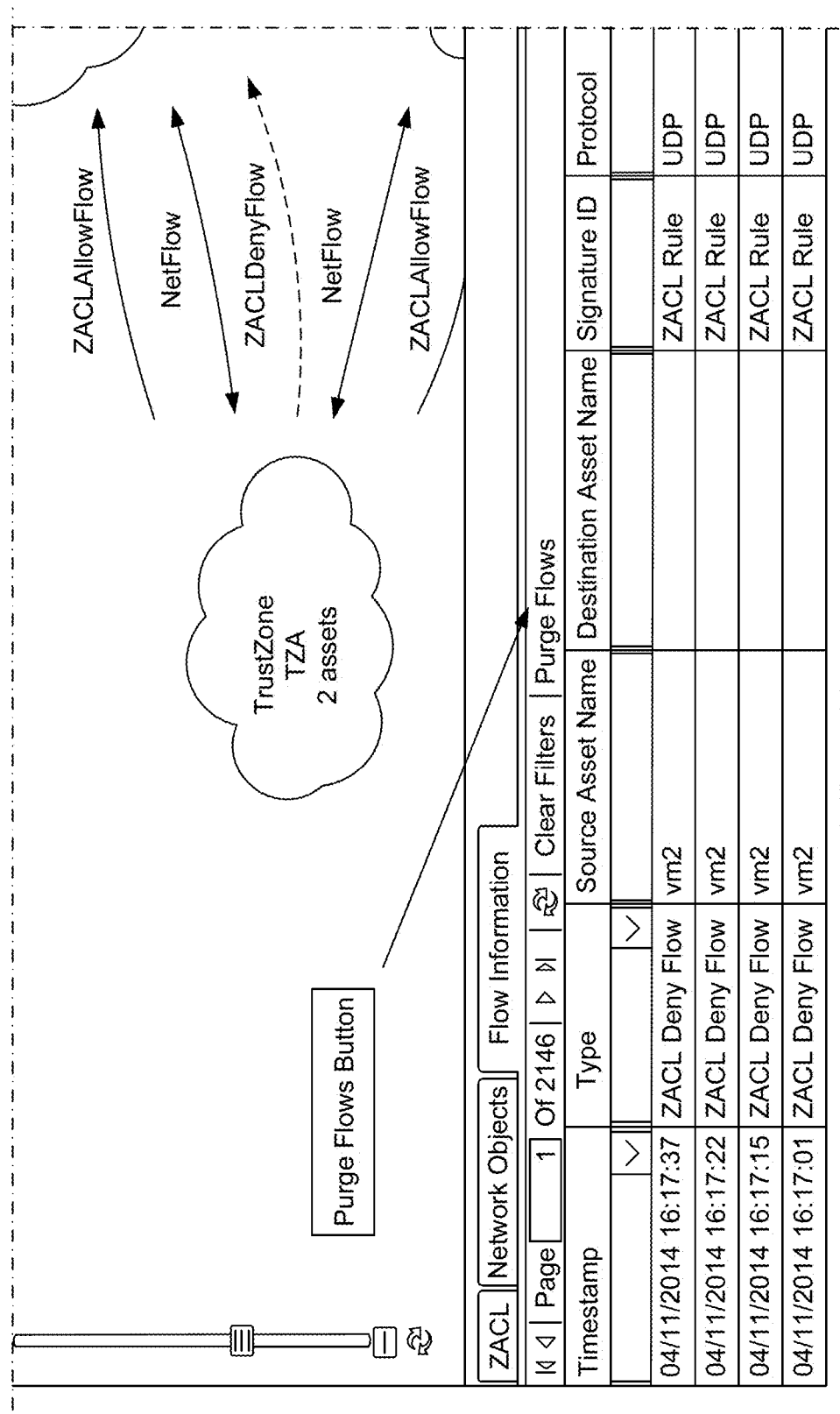

FIG. 18 illustrates a "purge flows" feature of an exemplary embodiment, whereby specific flows may be selected and removed from the flow information graph, thereby allowing a user to focus more precisely on a desired set of connections.

Figure 19:
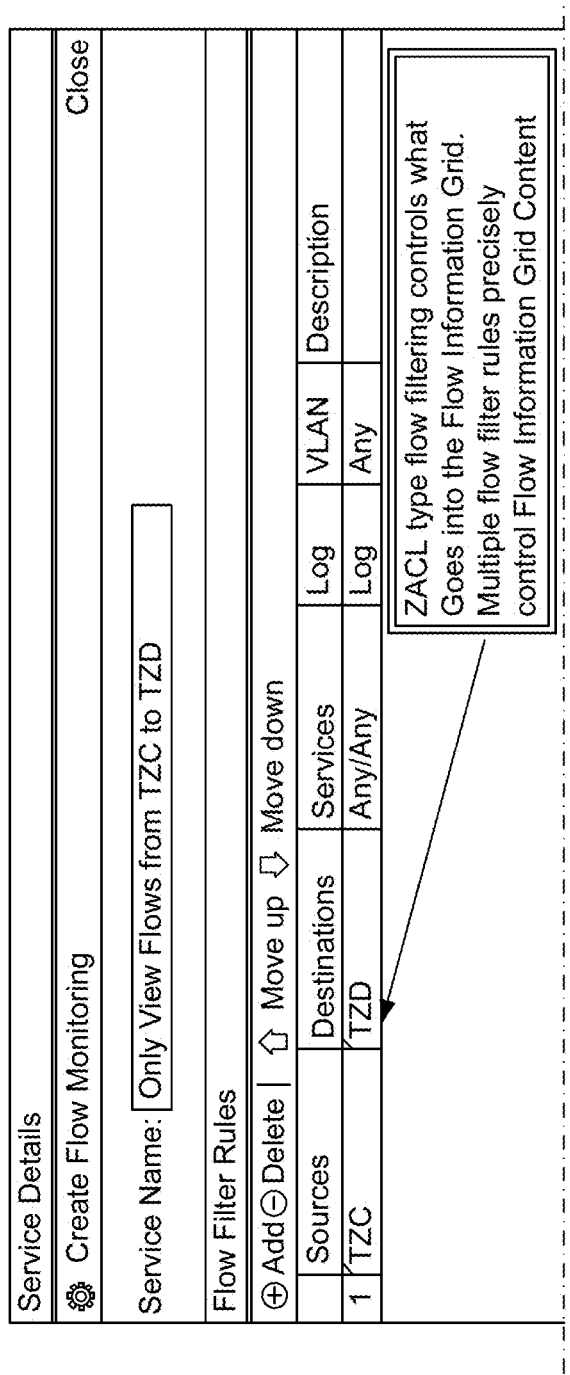

FIG. 19 illustrates the filtering of flows before they are displayed on the flow information graph (FIG. 10) or data table (FIG. 11). This further assists a user in selecting the specific flows of interest to the user.

Figure 20:
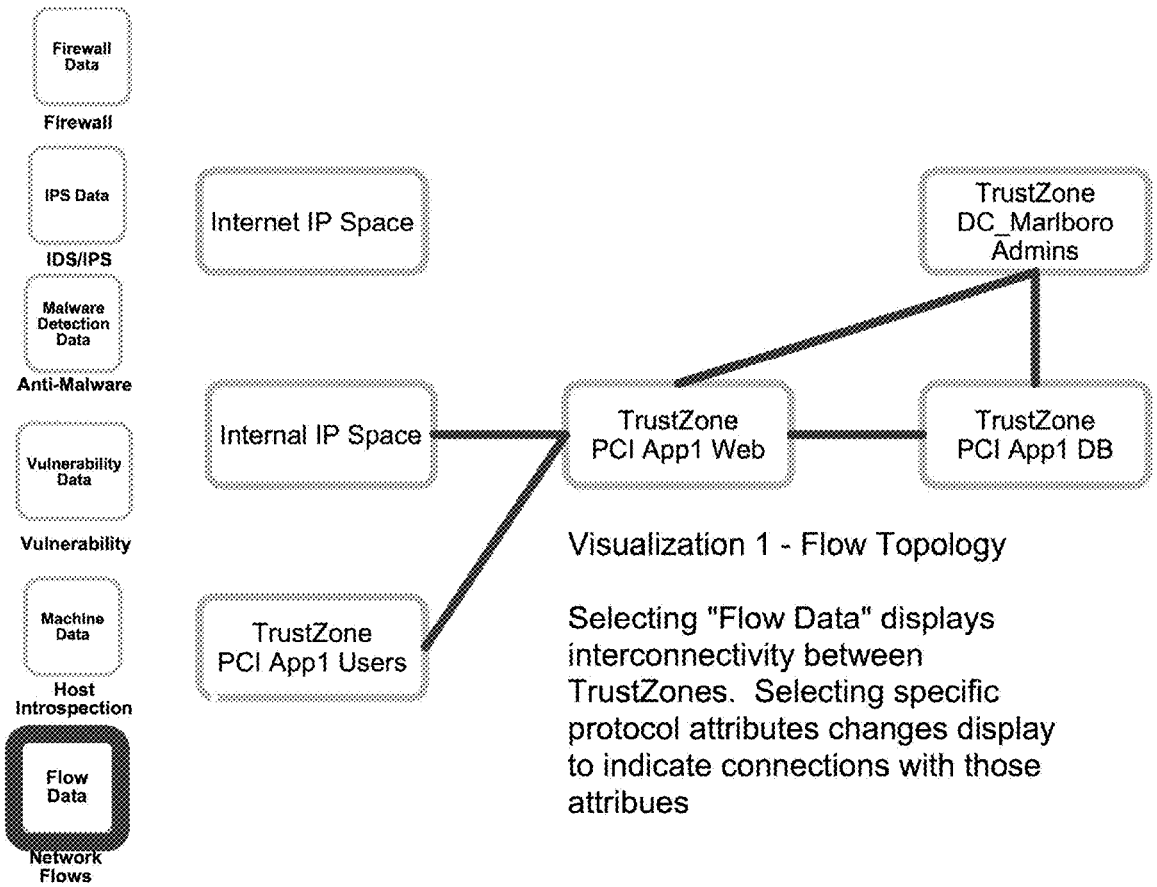
Figure 21:
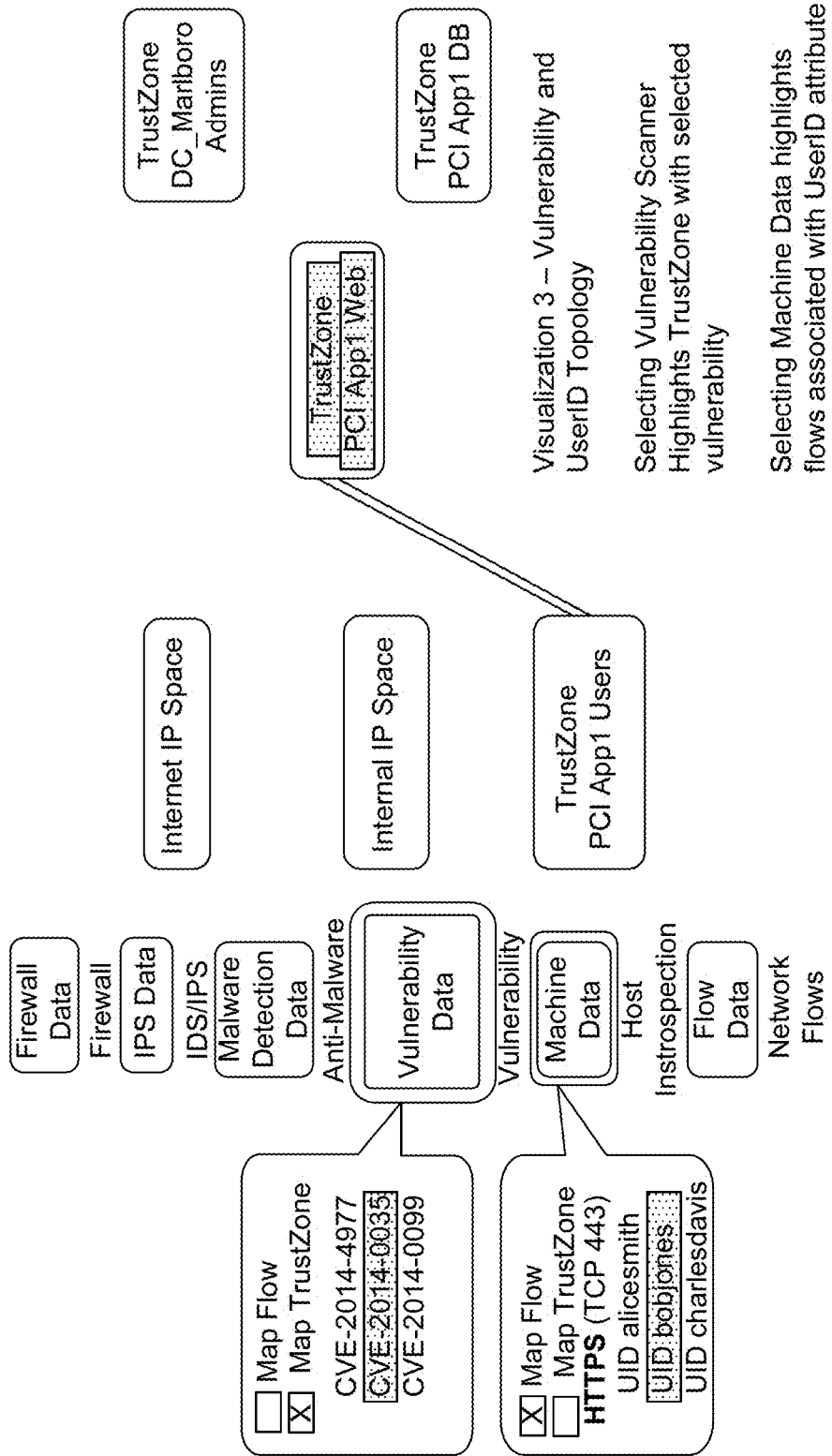
Figure 22:
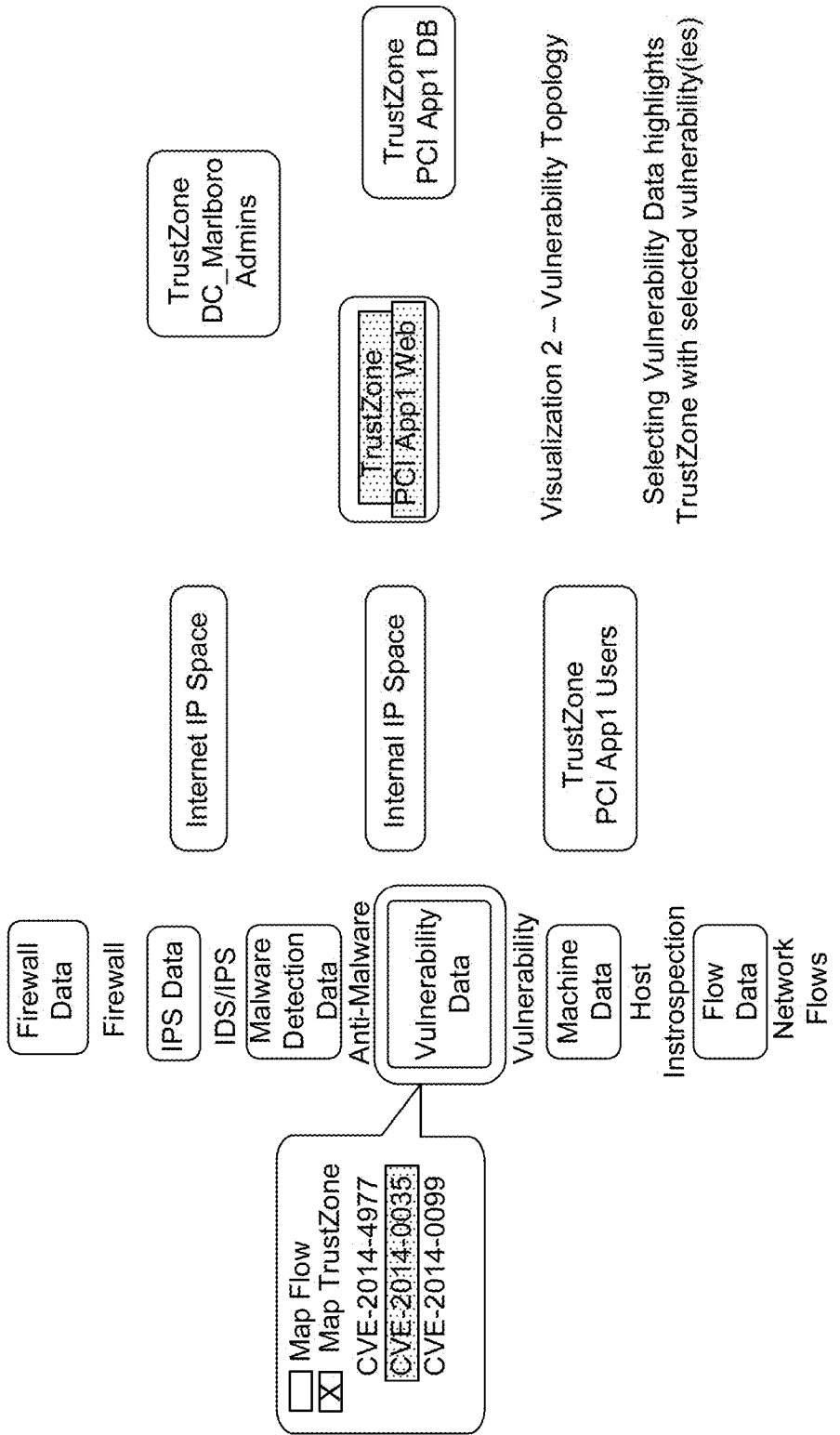

As described above, the flow information graph can depict a variety of different information regarding network assets and network connections between such assets. FIGS. 20-22 illustrate examples of flow information graphs that identify characteristics of connections between network assets and/or characteristics of assets. Identification of such characteristics may occur in response to selection of an attribute or other user input from a user via a user interface and/or based on automatic selection of characteristics by systems implementing the embodiments of the present disclosure.

FIG. 20 illustrates an exemplary flow information graph where a user has selected "flow data" from among a list of attributes in a set of collected data. In this example, the "flow data" icon on the left of the screen is highlighted, and bolded flow lines are drawn between each of the five network assets (i.e., TrustZones in this example) to show their respective connectivity based on the selected "flow data" attributes. In addition to bolding and highlighting, characteristics of assets and network connections may be visually indicated in a flow information graph using various combinations of text, fonts, icons, shading, and the like.

Any number of different attributes may be used to visually depict information regarding network connections and assets in a flow information graph. In FIG. 21, for example, A particular vulnerability from the "vulnerability data" menu on the left of the screen is selected. Here, the system has identified an asset in the flow information graph (i.e., the "TrustZone PCI App1 Web" asset) as being associated with the vulnerability (e.g., having the vulnerability due to out-of-date software) to be highlighted. Additionally, a user identifier ("bobjones") from the "machine data" attribute menu is also selected, and the connection between the "TrustZone PCI App1 Users" asset and the "TrustZone PCI App1 Web" asset is identified by the system as being associated with the selected user identifier and highlighted on the flow information graph accordingly. FIG. 22 depicts the appearance of the flow information graph in response to de-selection of the "machine data" attribute from FIG. 21, leaving only the "TrustZone PCI App1 Web" asset highlighted to correspond to the selected security vulnerability.

Figure 23:
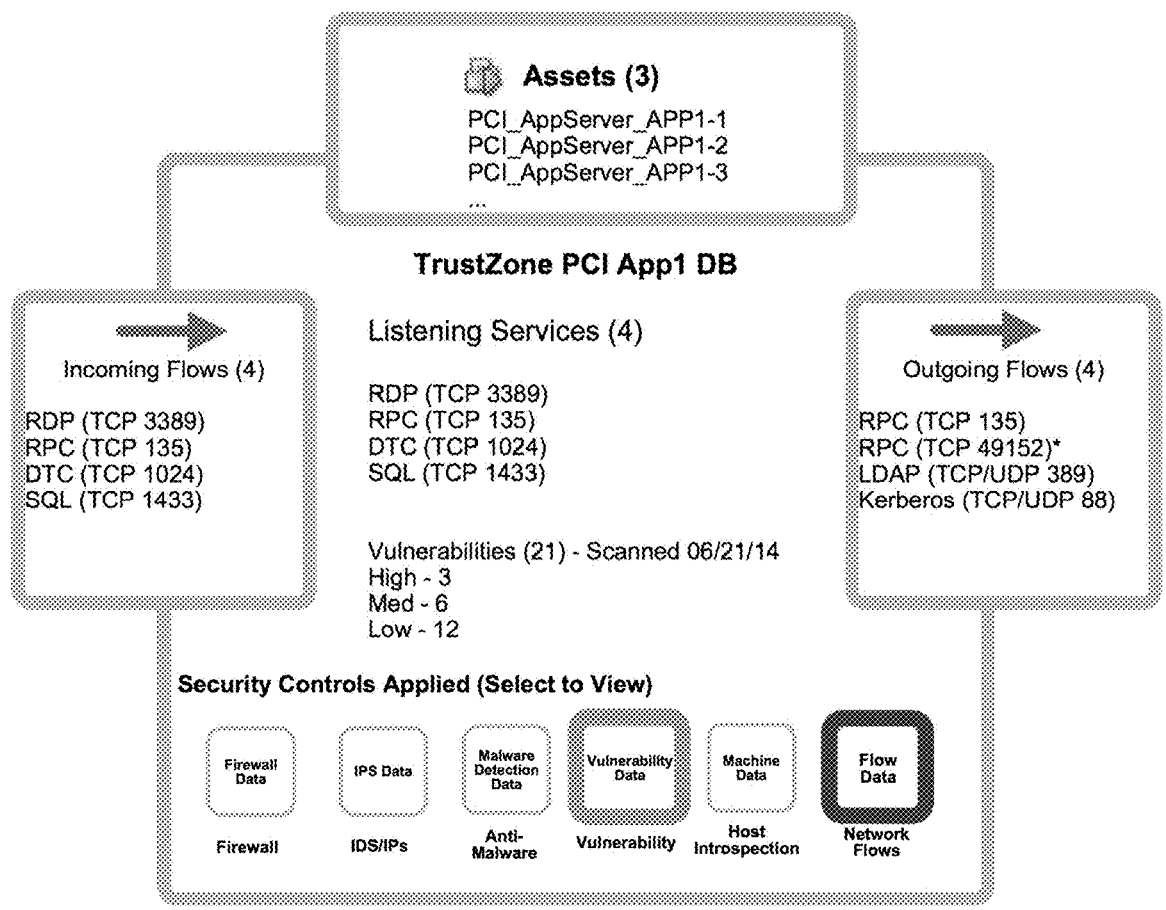
Figure 24:
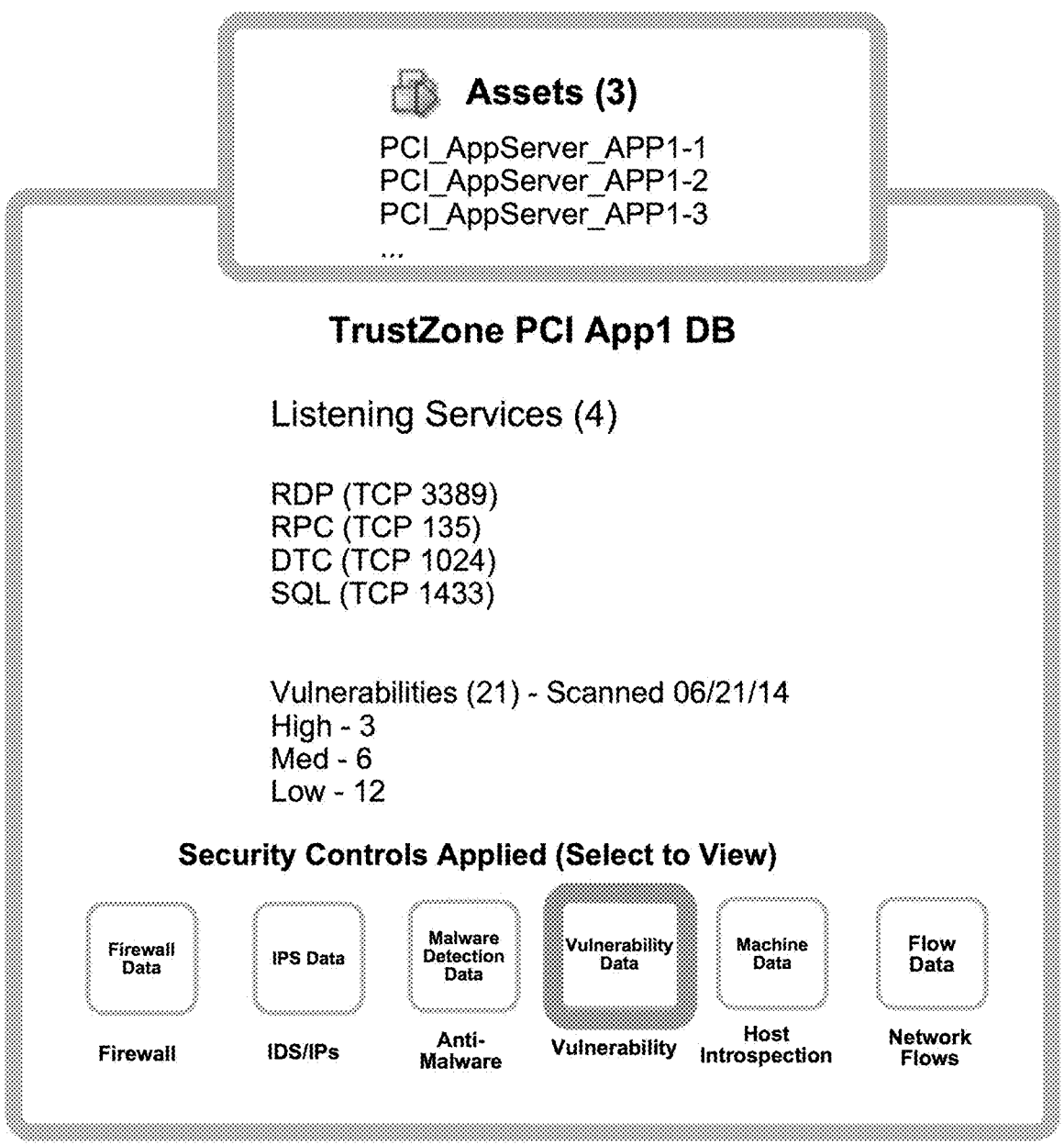

FIGS. 23 and 24 depict additional examples of information that may be depicted by flow information graphs. In FIG. 23, both the "vulnerability data" and "flow data" attributes are selected, as shown by their respective highlighting. At the top of the graph, information on three assets in the network is displayed, while the graph shows network data associated with the assets in the form of "incoming" flow data on the left of the graph and "outgoing" flow data on the right of the graph. System operational attributes are additionally shown in the middle of the graph. FIG. 24 illustrates the flow information graph of FIG. 23 without the "flow data" attribute being selected.

Updated data may be collected (955) on a periodic or real-time/near-real-time basis. The flow information graph displayed to a user may likewise be updated (960) and presented to show changes to assets and/or connections on a periodic or real-time/near-real-time basis.

Embodiments of the application may store (965) and analyze (970) the collected data, data related to the generation and/or presentation of the flow information graph, and other information. For example, the system implementing method 900 may store data collected and used to generate a flow information graph, as well as a snapshot of a particular flow information graph at a particular point of time or during a particular time period, thus enabling a user to retrieve a desired graph without having to re-create it from scratch. Any desired data may be analyzed for a variety of purposes. For example, the collected data may be analyzed (e.g., comparing it to a security policy, standards compliance policy, and/or a performance standard) and generating one or more alerts (975) based on the analysis.

Various reports may also be generated (980) and presented to users of the system and/or third parties. A report may be included in an electronic document, and may provide a summary of state, status, and/or history of some aspect of a network, TrustZones, and/or individual assets. In one exemplary embodiment, a report may be created that details the compliance state of all the assets in a TrustZone at the time the report is run. In another example, a report may be created to detail the detected vulnerabilities of all assets in a TrustZone or a particular asset. Reports may also be generated to provide a summary of information at a particular point in time (e.g., a "snapshot") or a summary of information over a period of time (e.g., showing trends in data) for TrustZones and/or assets. Exemplary embodiments may also generate a report that details the Zone Access Control List (ZACL), and all assets with their asset IP address(es) and TrustZone membership.

Method 900 further includes exporting information (985) to a third party. Any such information may be exported, such as the collected data, the flow information graph, and other information, thereby allowing the third party to perform its own analysis and processing of such data. Data may be exported to a third party in any desired manner, such as via an application program interface (API), through a real-time or near-real-time data stream, or via any other desired interface.

Updating Security Controls or Policies Based on Metadata

As discussed above, various embodiments of the present disclosure can collect and/or create metadata, analyze such metadata, and then perform actions (e.g., implementation or updating of a security control) based on this analysis. Some of these embodiments are described below. In some cases, the methods described below may be used with some aspects of the embodiments described above. However, the methods described below are not limited to use or implementations as described above. In other embodiments, the methods below may be used independently of any specific embodiments described above. For example, the methods below may be used on cloud processing or other platforms that differ from that described above.

As discussed above, the metadata may be collected, for example, from different platforms (e.g., from an Amazon Web Services platform and from an Azure platform). The actions performed may include, for example, updating security policies and/or controls for objects on one or more of the platforms from which data is collected. Other actions include, for example, reporting of data flows to a user and/or another computing device. The reporting may be based, for example, on analysis of the metadata.

FIGS. 25-31 show the collection and/or creation of metadata, analysis of such metadata, and actions performed based on the analysis, according to various embodiments of the present disclosure. Some embodiments are now described below.

In one embodiment, metadata may be collected, for example, as collection of data is described with reference to FIG. 4 or 9 above. Metadata may be, for example, asset, network data, or event streams collected from one or more different platforms (e.g., platforms on which virtual machines are running) and/or platform specific tags. In one embodiment, the metadata is analyzed in the context of event streams. The event streams can be collected, in one non-limiting example, using security control management system 200 above. In one embodiment, network flows may be reported to a user, for example, as described with reference to one or more of FIGS. 10-24.

In one embodiment, based on metadata analysis, security policies or controls can be changed. In one non-limiting example, a TrustZone or logical group for an asset can be changed as was described above. In one embodiment, a change in metadata causes a change in security policy.

In one embodiment, a method uses arbitrary platform-ingested metadata. A platform is queried, e.g., via public APIs for account-specific, user-applied metadata tags. Platform inventory and tags are stored and presented to the user. The user is able to view aggregate communication flows between inventory assets grouped by selected metadata tags. In one non-limiting example, collected metadata includes attributes for assets as was described in the embodiments above. These assets can include virtual machines.

In one embodiment, metadata is collected for components within a system comprising multiple different platforms. Each component may be associated with one or more tags (e.g., a unique tag, or a group tag). The tag may be, for example, a key that can have various values. In one embodiment, the tag can be applied to a group of virtual machines. In one embodiment, the user can create tags.

In one embodiment, a method uses arbitrary platform-independent metadata. A user is able to apply arbitrary metadata to inventory assets independent of any platform constraints on metadata tagging. This metadata is retained independent of the underlying platform and available for viewing and editing by the user. The user is able to view aggregate communication flows between inventory assets grouped by selected metadata tags (e.g., grouped by this independently-maintained platform agnostic metadata). In one example, input provided by the user via a user interface is used to create tags for components in a network.

In one embodiment, a method uses policy-based platform-independent metadata tagging. A user creates a policy that dictates tagging of newly-discovered inventory assets based on static (e.g., non-varying over time) and dynamic (e.g., changing in real-time) attributes based on analysis of collected data, tags, and metadata.

In one embodiment, data flows into and out of each of a plurality of virtual machines is observed. A virtual machine having a data flow exceeding a defined threshold is classified as a "talker" having a high dataflow. A visual representation is provided to a user to indicate these talkers to the user.

In some cases, a new vulnerability event may be detected, for example, based on its association with a talker. In one example, a particular port used for communication that is associated with the vulnerability event is identified. In response to identifying the event, metadata is applied to the components that have been associated with or that have communicated with that port. For example, these components may have used a common service associated with that port.

In one embodiment, a method uses arbitrary dynamically-inferred metadata: credentialed, or non-credentialed. A user creates metadata tags that are evaluated periodically and/or on user-defined events. For example, a credentialed inquiry may be as follows: "Is the virus program running?". In one example, credentialed metadata refers to metadata that is bound to a user or an asset with a domain name.

In one embodiment, a method uses optional platform metadata synchronization. A user edits platform-ingested metadata values, which are then pushed to at least one platform. In one embodiment, assets are tagged to indicate ownership by the user. In one embodiment, collected and/or derived metadata is synchronized and then pushed down lower in a network.

In one embodiment, a method uses policy-based actions invoked via changes in dynamically-inferred metadata (e.g. a new vulnerability involving Secure Shell). A dynamic non-credentialed metadata attribute is defined, for example, on an instance: "Is port 22 open?" If this attribute evaluates to True, a security control policy may be modified (e.g., the instance is moved to a security group that restricts port 22 communication).

In one embodiment, a method uses cross-platform metadata tagging. Metadata is applied to accounts in a heterogeneous platform environment. The metadata is mapped to the underlying platform tagging infrastructure when possible; otherwise the metadata is retained in the application storage. The user is able to view communication on the connected platforms grouped by desired metadata tags. For example, a consistent security posture is used across platforms. For example, a local infrastructure is in VMware, and then the system needs to push or burst out to Amazon Web Services (AWS)—the same control policies would be applied.

In various other embodiments, by allowing a user to create policies that create metadata and having policies that affect security controls (e.g., change security groups), the system will create and maintain a state machine based on data and metadata (which may be complex) that the asset would transit throughout it's lifecycle. The system above can create a visual representation of the state machine, to make the asset lifecycle within context of security, configuration, etc., more easily interpreted by, or reported to, a user.

Figure 25:
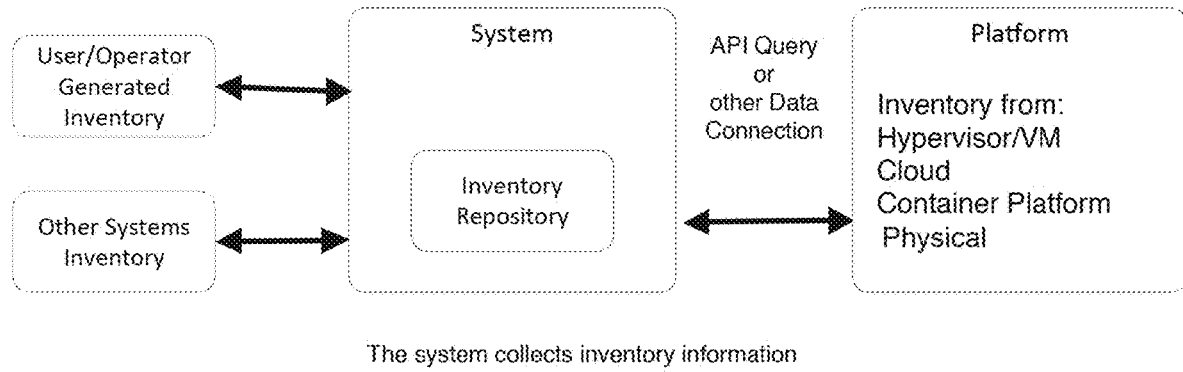
FIGS. 25-31 show collection/creation of metadata, analysis of such metadata, and actions performed based on the analysis, according to various embodiments of the present disclosure.

FIG. 25 shows a system collecting inventory information (e.g., data regarding virtual machines running on an AWS platform, and other data from virtual machines running on an Azure platform). The system may update and/or implement security controls and/or policies as described above. In one non-limiting example, the system may be security control management system 200, which was discussed with reference to FIG. 2 above. Inventory repository of FIG. 25 can be implemented, for example, using a database as described for system 200 above.

Figure 26:
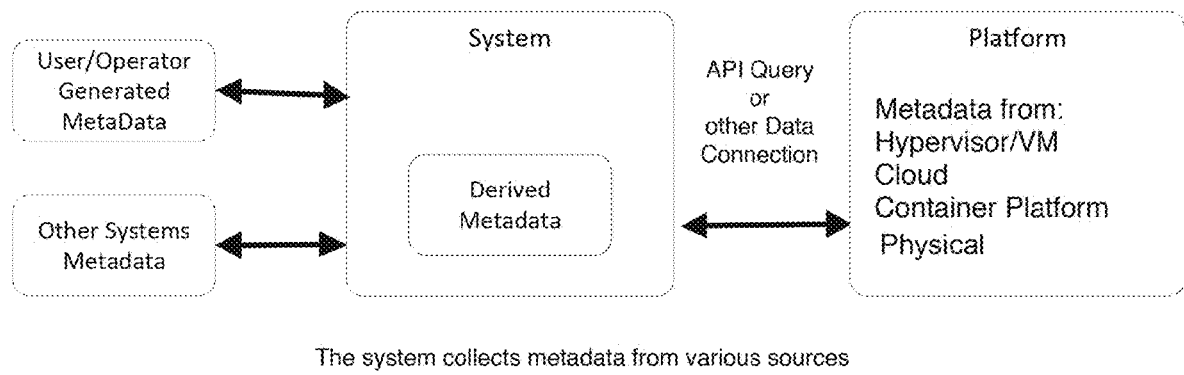

FIG. 26 shows a system collecting metadata from various sources.

Figure 27:
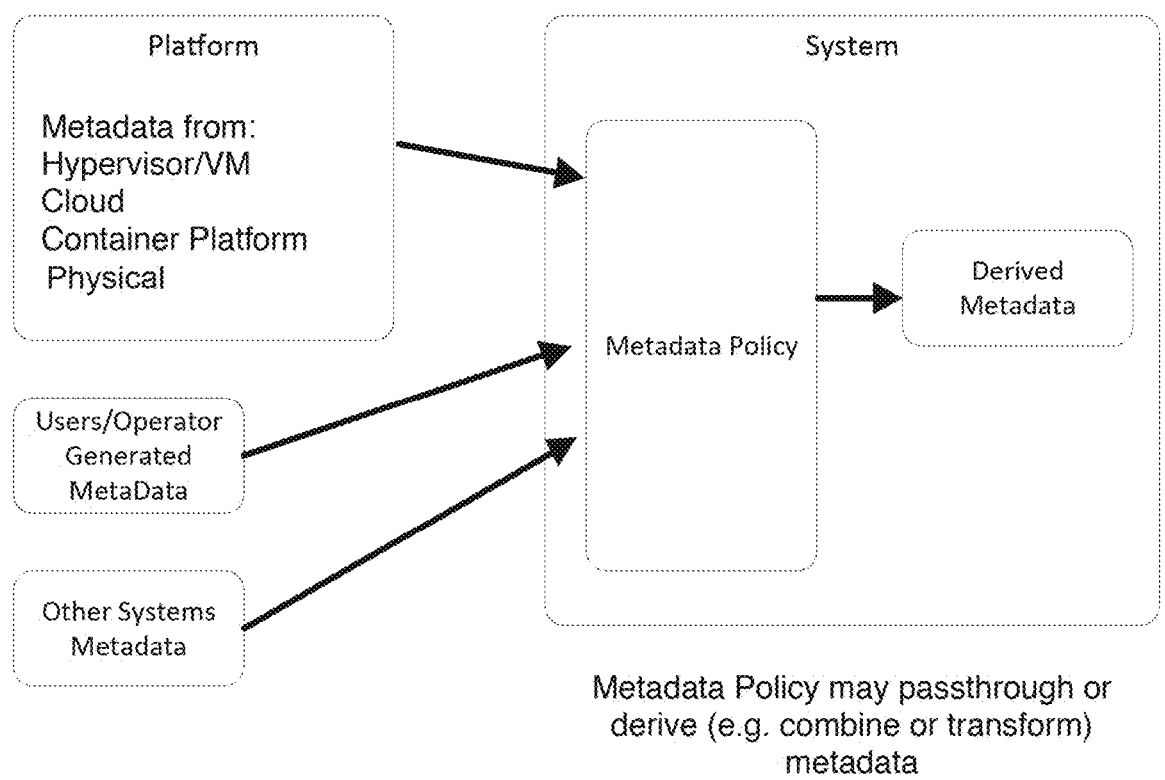

FIG. 27 shows a metadata policy of the system that is used to derive metadata from collected metadata and/or to create new metadata. For example, the metadata policy may pass through metadata provided by a user. In one example, the user may create metadata via a user interface that reports communication flows in a network to the user.

Figure 28:
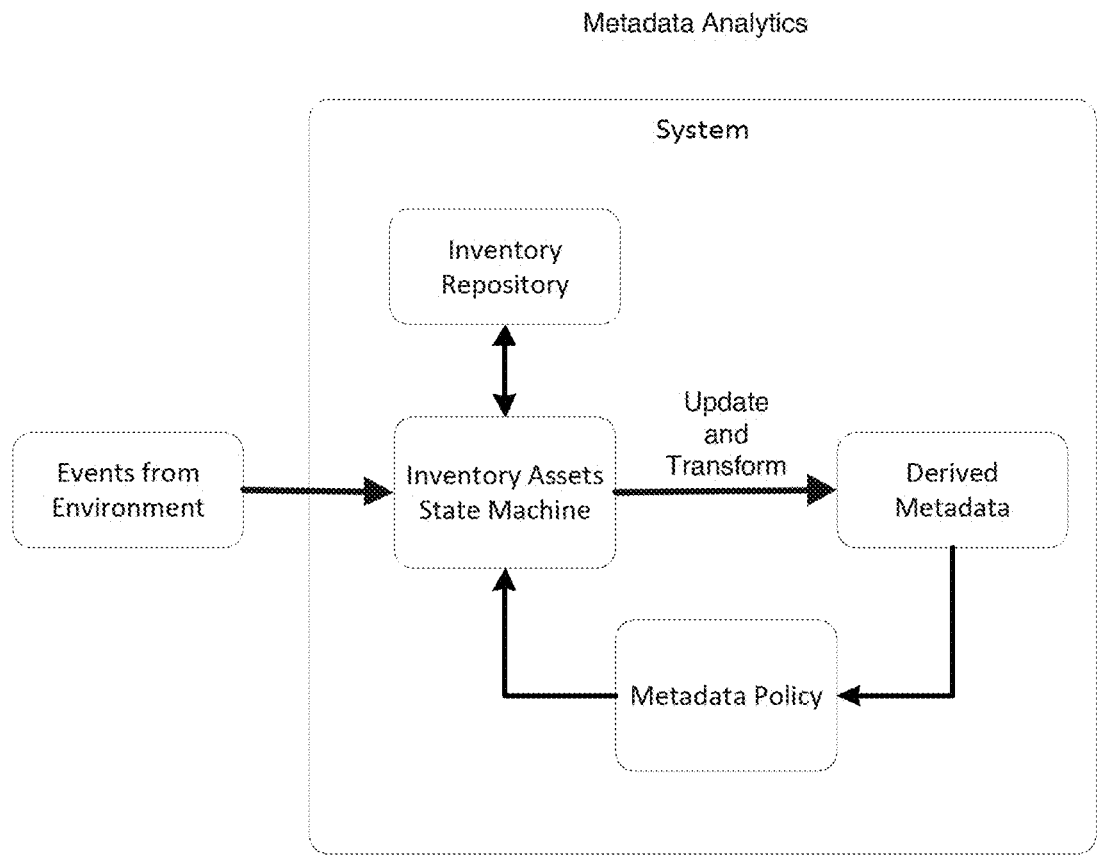

FIG. 28 shows metadata analytics used to evaluate the data that has been collected, derived, or otherwise created. A state machine associated with inventory assets uses events from a network environment as inputs, and updates and transforms data to provide derived metadata. The derived metadata is processed using a metadata policy, which then provides a result that feeds back into the state machine. In one example, the inventory assets correspond to the inventory repository, which was discussed with reference to FIG. 25.

Figure 29:
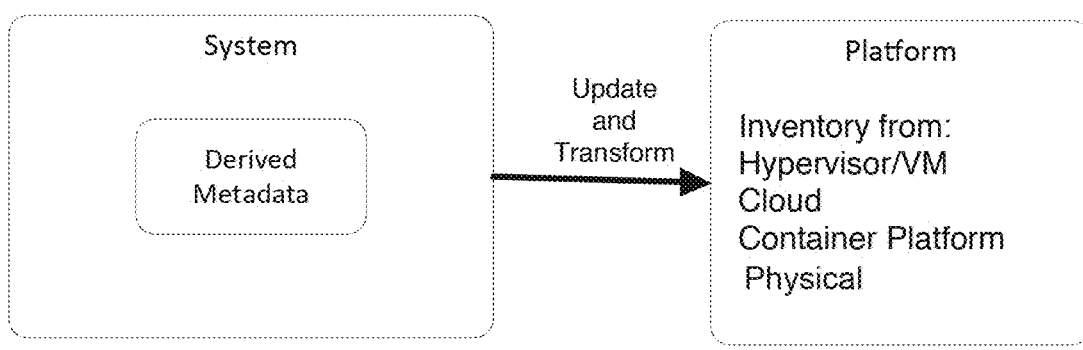

FIG. 29 shows derived metadata that is pushed back to platforms by the system. In one embodiment, the derived metadata is transformed in a different or unique way for each of several different platforms. This transformation provides transformed metadata that is suitable for and/or corresponds to specific platforms such as cloud platforms, virtualization platforms, container platforms or operating systems running on hardware. The transformation considers the specific communications requirements, data storage requirements, and nomenclature of the platform (e.g., API constraints or limitations).

Figure 30:
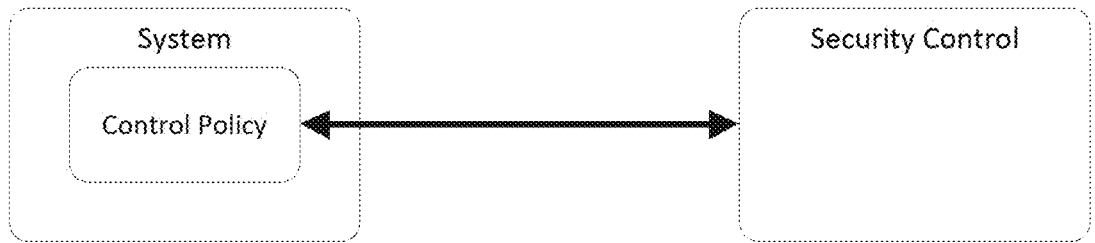

FIG. 30 shows the system interacting with controls in the environment. The system collects policy information. The control policy of the system implements policy updates based on, for example, collected and/or derived metadata. In one example, the security control is updating the configuration for a firewall to open or close a port.

Figure 31:
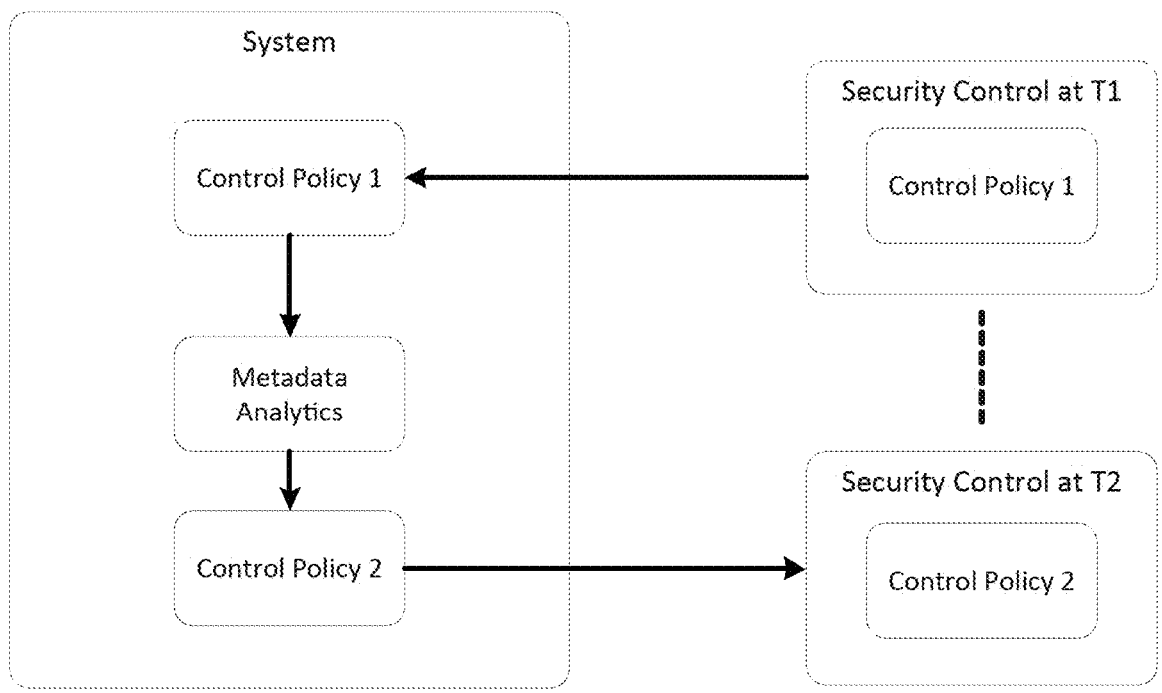

FIG. 31 shows actions taken based on results from metadata analytics. These actions include modification of control policies and/or initiation of policy changes. As illustrated, control policy 1 can be an existing policy on a first platform. Control policy 2 can be, for example, an update of control policy 1. Control policy 2 can be pushed to be implemented on, for example, the first platform, and/or a second different platform. The first and second platforms may differ in software and/or hardware requirements as regards running virtual machines.

Variations on Updating Security Controls or Policies Based on Metadata

Various embodiments described below relate to collecting and/or creating metadata to provide derived metadata. For example, the metadata is collected by a system from a computing environment. For example, new metadata can be created based on the collected metadata. In one example, the new metadata is created based on one or more policies (e.g., a lifecycle policy).

The system analyzes the derived metadata. For example, the derived metadata can be analyzed based on one or more policies (e.g., a security and analytics policy). Based on this analysis, the system performs one or more actions. For example, the system can generate a report for display in a user interface of a computing device. For example, the system can generate an alert of varying formats depending on the operational environment and type, and/or severity of a detected threat.

As used for the embodiments below, a policy generally includes one or more conditions and one or more corresponding actions. For example, when a policy is evaluated, a determination is made whether the one or more conditions are satisfied (e.g., is a condition true?). If the one or more conditions are satisfied, then the one or more corresponding actions are performed (e.g., a security action is performed).

As described for the various embodiments below, metadata generally includes data and data attributes collected from an environment (e.g., from a platform or other computing system or device). For example, a tag is a type of metadata. Some examples of a tag were discussed above.

Examples of an environment from which metadata is collected include a hypervisor, a virtual machine, a cloud, a container platform, and/or a physical computing device.

In some examples, metadata can also be collected from users and system operators. For example, the metadata can be collected based on input data provided by a user into a user interface of a computing device. In some cases, the user interface displays reports and/or alerts as described further below. In one example, a user provides metadata via a user interface on a user computing device that displays inventory information to the user (e.g., displays metadata for each of several objects in inventory). In one example, metadata is imported or otherwise received from other computing devices (e.g., automated systems that collect metadata from one or more platforms).

In one embodiment, metadata is applied to inventory. For example, inventory generally includes objects. Examples of objects that can be in inventory include assets, entities, virtual machines, security groups, and/or virtual clouds. For example, applying metadata to an inventory object includes updating one or more tags associated with the object.

In one example, applying metadata to an inventory object (e.g., an asset) results in the asset being moved. For example, a tag is applied to the asset, which causes the asset to be moved from one security group to another security group. In one example, the security groups are each associated with the same platform.

In one example, multiple tags can be applied to an object (e.g., an asset) that resides on the platform. Each tag alone and/or a predetermined combination of tags can cause corresponding changes to an asset (e.g., moving of the asset, a change in security requirements for the asset, etc.). In one example, one or more tags can be applied to an object (e.g., a security group, and/or a virtual cloud).

Figure 34:
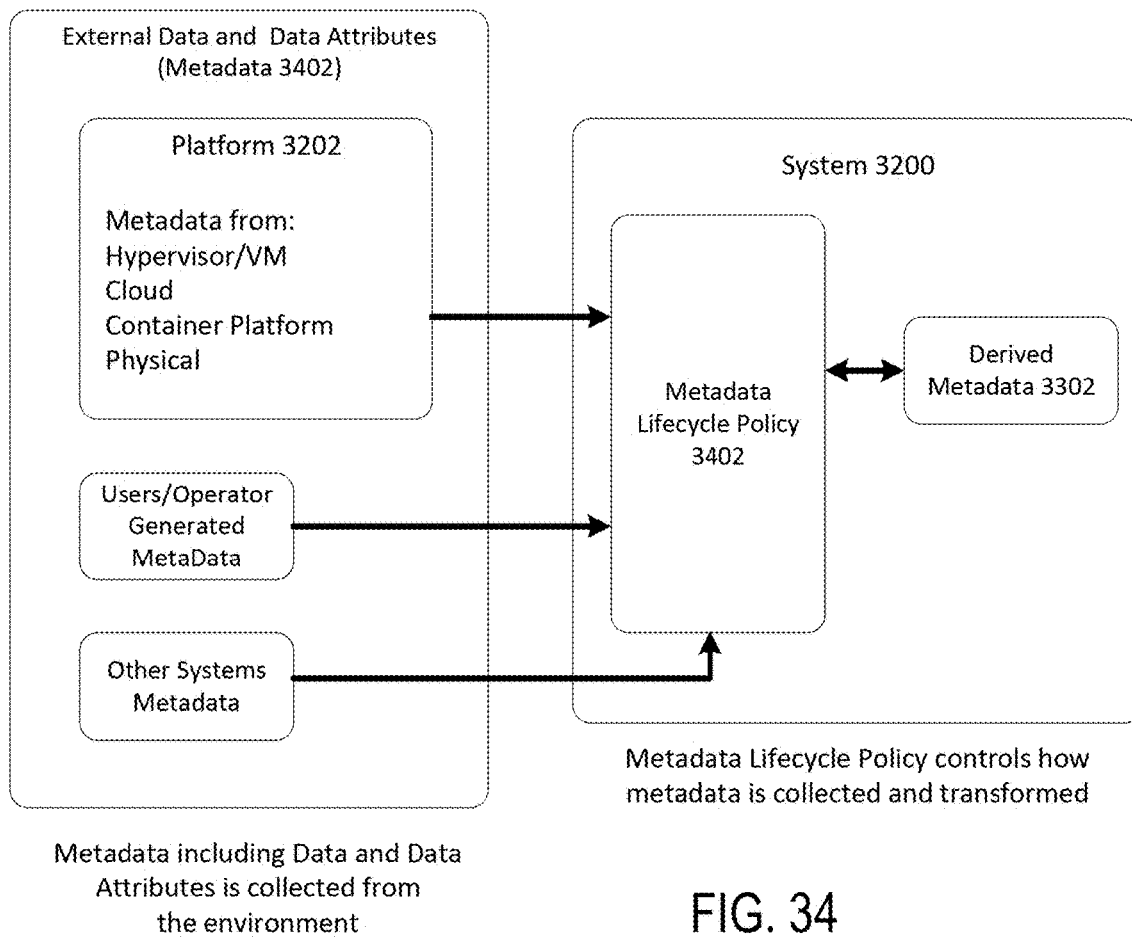
FIG. 34 shows collection and transformation of metadata using a lifecycle policy according to one embodiment of the present disclosure.

In some embodiments, one or more lifecycle polices are evaluated. A lifecycle policy generally includes policies that relate to controlling the collection of metadata and/or the transformation of metadata. In one example, a lifecycle policy defines how collected metadata is transformed to create new metadata. For example, the new metadata becomes part of derived data (e.g., as illustrated in FIG. 34).

In some embodiments, one or more security and analytics policies can be used in addition to the one or more lifecycle policies above. In one embodiment, a system collects metadata from objects on one or more platforms. The system evaluates, based on the collected metadata, one or more lifecycle policies in order to provide derived metadata. The system evaluates, based on the derived metadata, one or more security and analytics policies. Based on evaluation of the security and analytics policies, the system performs one or more actions on one or more objects. These objects are on one or more of the platforms from which the metadata was initially collected.

In one example, lifecycle policies are used to evaluate inventory attributes, state, data, third-party data, and collected metadata. In some cases, this evaluation can be used to create metadata. The created metadata can be combined with collected metadata to provide derived metadata.

In some cases, a system evaluates the lifecycle policies to apply and/or remove metadata from certain objects in an inventory of objects that is maintained by the system (e.g., the system stores this inventory-associated metadata in an inventory database). For example, if a policy is true for a certain object, then metadata is created and applied to that object.

In some cases, the inventory-associated metadata is published to the platform on which the objects reside. For example, the platform can implement security actions after the inventory-associated metadata is published.

In one example, security and analytics policies are used to evaluate the presence or absence of metadata on inventory objects. For example, the security and analytics policies determine whether predefined metadata is associated with a certain object in the inventory above. Based on this evaluation, a system uses the security and analytics policies to perform actions. Such actions include, for example, creating alerts, generating reports, and/or invoking security actions on a platform. For example, if a policy is true, then a predetermined security action is performed.

In some cases, after each security action is completed, metadata can be added or removed from one or more objects in the inventory. For example, after completion of a security action, a tag is removed from an asset in inventory.

Figure 32:
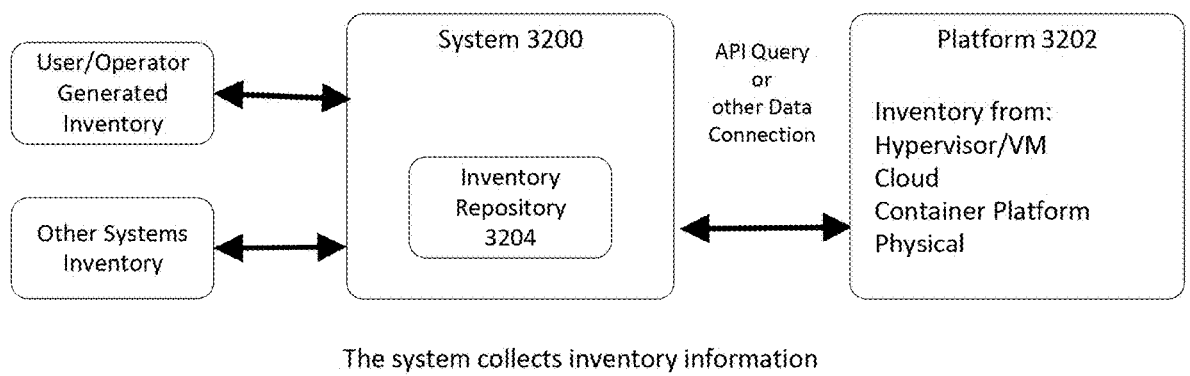
FIG. 32 shows collection of inventory information according to one embodiment of the present disclosure.

FIG. 32 shows collection of inventory information according to one embodiment of the present disclosure. Inventory information is collected by system 3200 and stored in inventory repository 3204. In one example, the inventory information is collected over a network using an API query or other data connection. For example, the inventory information is collected from platform 3202. The information is collected from, for example, a hypervisor and/or one or more associated virtual machines, one or more virtual clouds, a container platform, and/or one or more physical computing devices.

In addition to the inventory information collected from platform 3202, other inventory information can be collected from other computing devices. For example, a user/operator can provide inventory information via the user interface of a computing device. For example, another computing device can provide inventory information regarding objects on platform 3202 and/or on other platforms.

In one example, inventory repository 3204 includes information regarding objects on platform 3202. This information can include, for example, an identifier or other data that uniquely identifies each object in the inventory.

Figure 33:
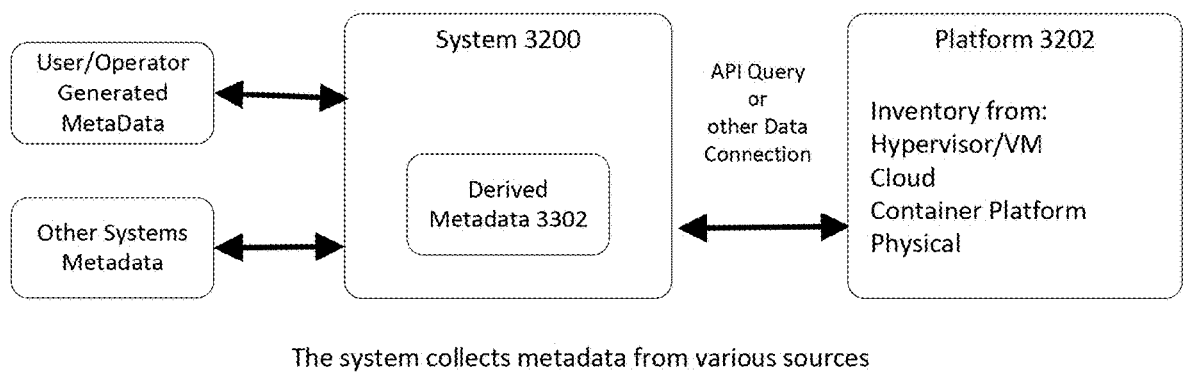
FIG. 33 shows collection of metadata from various sources according to one embodiment of the present disclosure.

FIG. 33 shows collection of metadata from various sources according to one embodiment of the present disclosure. System 3200 collects metadata from platform 3202 over a network using an API query or other data connection. The metadata can be collected from various objects on platform 3202. For example, these objects can include a hypervisor, a virtual machine, a cloud, container platform, and/or a physical device. The collected metadata is maintained by system 3200 as part of derived metadata 3302. In one example, derived metadata 3302 is stored in a database or other data repository of system 3200.

In addition, other metadata can be collected from other computing devices. For example, a user/operator can provide metadata associated with a particular object using a user interface of a computing device that is in communication with system 3200 over a network. Also, other computing devices can provide metadata information associated with some or all objects on platform 3202.

FIG. 34 shows collection and transformation of metadata using a lifecycle policy 3402 according to one embodiment of the present disclosure. Lifecycle policy 3402 can represent one or more policies. System 3200 evaluates each of policies 3402 to control how metadata is collected and transformed.

System 3200 collects metadata 3402, which includes external data and data attributes. For example, metadata 3402 includes data collected from platform 3202, as discussed above. Also, data attributes can be collected from, for example, third party security controls, threat feeds, and network infrastructure telemetry. Examples of data attributes include, for example, Indicators of Compromise (e.g., network hosts or malware signatures) and associated severity/relevance, as well as third party security control posture.

In one embodiment, derived metadata 3302 includes metadata 3402. Lifecycle policy 3402 controls the manner of collection of metadata 3402. For example, system 3200 can evaluate each of several policies to determine from which objects to collect metadata. The evaluation of each policy can also define the type of data that is to be collected. In one example, the environment from which metadata 3402 is collected includes platform 3202.

System 3200 also uses lifecycle policy 3402 in order to create new metadata based on metadata 3402 that has been collected. The newly created metadata is included in derived metadata 3302. For example, derived metadata 3302 is maintained by system 3200 in a data repository.

Figure 35:
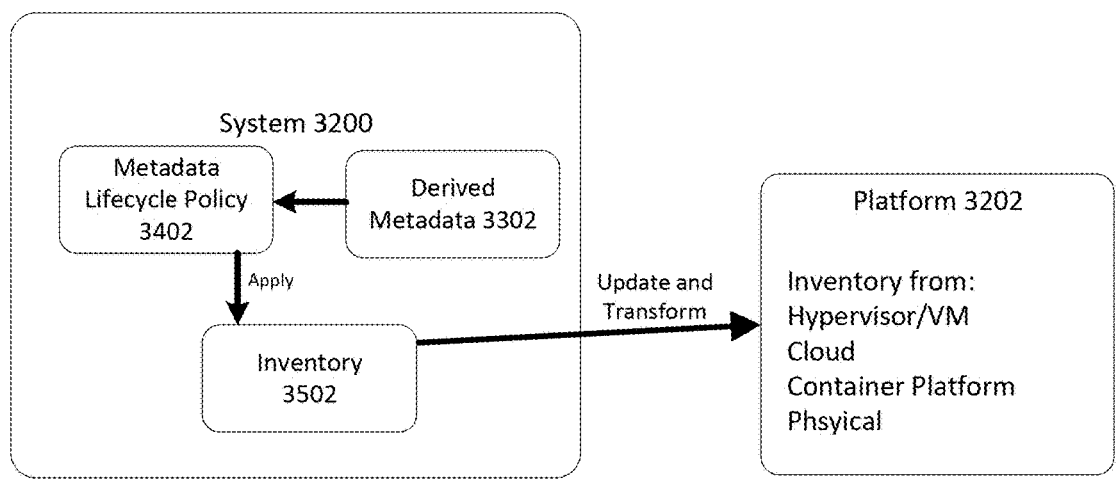
FIG. 35 shows applying metadata to inventory objects based on a lifecycle policy according to one embodiment of the present disclosure.

FIG. 35 shows applying metadata to inventory objects based on lifecycle policy 3402 according to one embodiment of the present disclosure. For example, some or all of derived metadata 3302 is evaluated by lifecycle policy 3402. For each policy having a condition or conditions that are satisfied, derived metadata 3302 is applied to one or more objects in inventory 3502. In one example, a tag is applied to a group of objects. In one example, the group of objects is specified by the policy that has been evaluated. In one example, the group of objects corresponds to objects in a TrustZone or other logical zone.

In one embodiment, the metadata applied to inventory 3502 is published to platform 3202. In one example, the metadata is published by communicating inventory data over a network to platform 3202. In one example, the inventory data includes identifiers for objects and the associated metadata that has been applied to the object based on lifecycle policy 3402. In one example, updated tags are associated with virtual machines on platform 3202.

Figure 36:
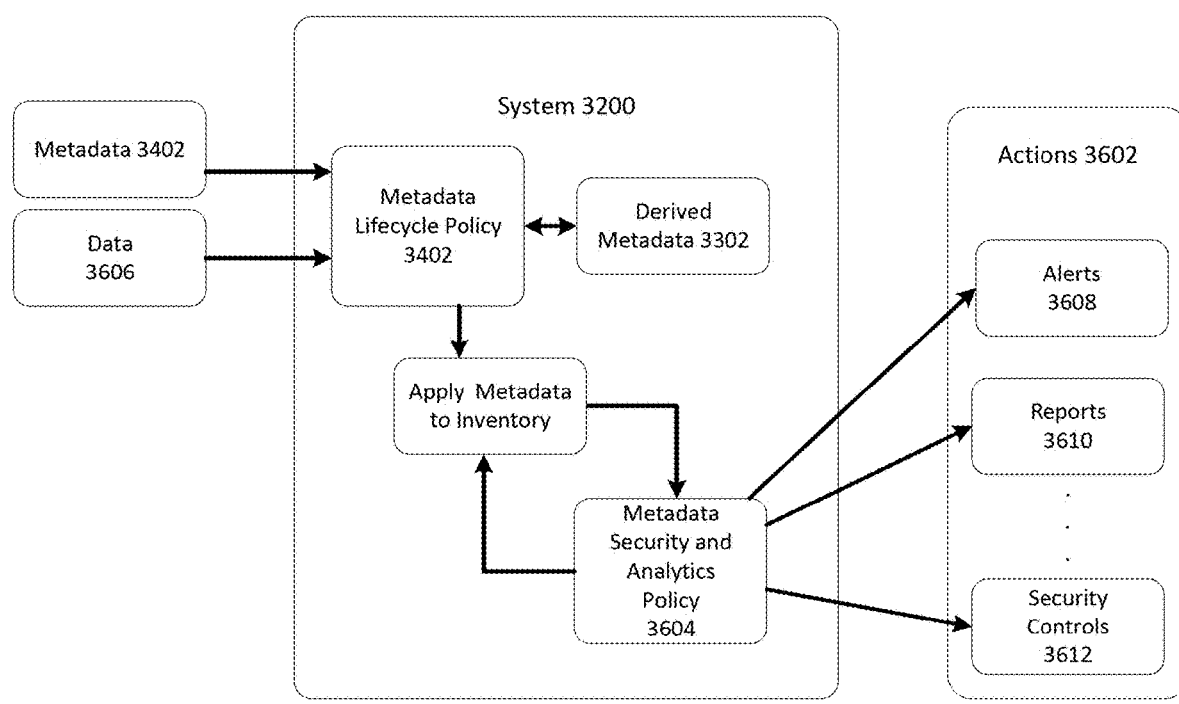
FIG. 36 shows evaluation of metadata to produce alerts, reports, and/or interactions according to one embodiment of the present disclosure.

FIG. 36 shows evaluation by system 3200 of metadata 3402 to generate alerts 3608, reports 3610, security controls 3612, and/or other interactions according to one embodiment of the present disclosure. One or more security and analytics policies 3604 are evaluated using metadata that has been applied to inventory (e.g., objects in inventory 3502).

In one example, evaluation of security and analytics policy 3604 results in one or more interactions by system 3200 with platform 3202 and/or other computing devices. For example, system 3200 can interact with controls in an environment and collect policy information.

In one embodiment, derived metadata 3302 is applied to objects in inventory 3502. Security and analytics policies

3604 are evaluated based on the derived metadata 3302 that has been applied to the objects in inventory 3502.

In one example, security controls 3612 are applied to platform 3202. In one example a security control modifies firewall rules for one or more objects. In one example, the firewall rules for the objects are modified in response to detecting a security threat associated with the one or more objects. Other examples of security controls include multi-factor authentication, an increased level of monitoring detail, and platform actions invoked on the objects (e.g., termination of VM) or via endpoint protection (e.g., termination of processes running in the VM).

For each of security and analytics policies 3604 having one or more conditions satisfied, one or more actions 3602 are performed. For example, an alert 3608 can be transmitted to one or more computing devices over a network. For example, a report 3610 can be generated and transmitted for display in a user interface of a user device. For example, one or more security controls 3612 can be generated and are updated.

As mentioned above, lifecycle policy 3402 is evaluated based on collected and/or created metadata (e.g., derived metadata 3302). In one embodiment, the evaluation of one or more lifecycle policies 3402 can be further based on data 3606 collected from one or more other computing devices. Examples of data 3606 include external threat feeds (e.g., operating system vulnerabilities).

In one embodiment, derived metadata 3302 is organized by a taxonomy. In one example, the taxonomy may be a list of labels, a map of key/value pairs, or a map from keys to a list of values. The metadata may be name-spaced to separate user (ingested) data from system (derived) data. The system may, for example, encourage, require, or enforce compliance with user-curated namespace guidelines.

In one embodiment, system 3200 receives metadata 3402 including data from one or more hypervisors on platform 3202. In one example, the data from the hypervisor includes virtual machine (VM) operating system type and/or version.

Figure 37:
FIG. 37 shows interaction with security controls and collection of policy information according to one embodiment of the present disclosure.

FIG. 37 shows interaction with security controls 3702 and collection of policy information according to one embodiment of the present disclosure. As mentioned above, evaluation of metadata by one or more security and analytics policies 3604 can cause system 3200 to collect policy information from one or more security controls 3702. In one example, security controls 3702 are on platform 3202. In one example, system 3200 stores control policy data collected from one or more security controls 3702.

Figure 38:
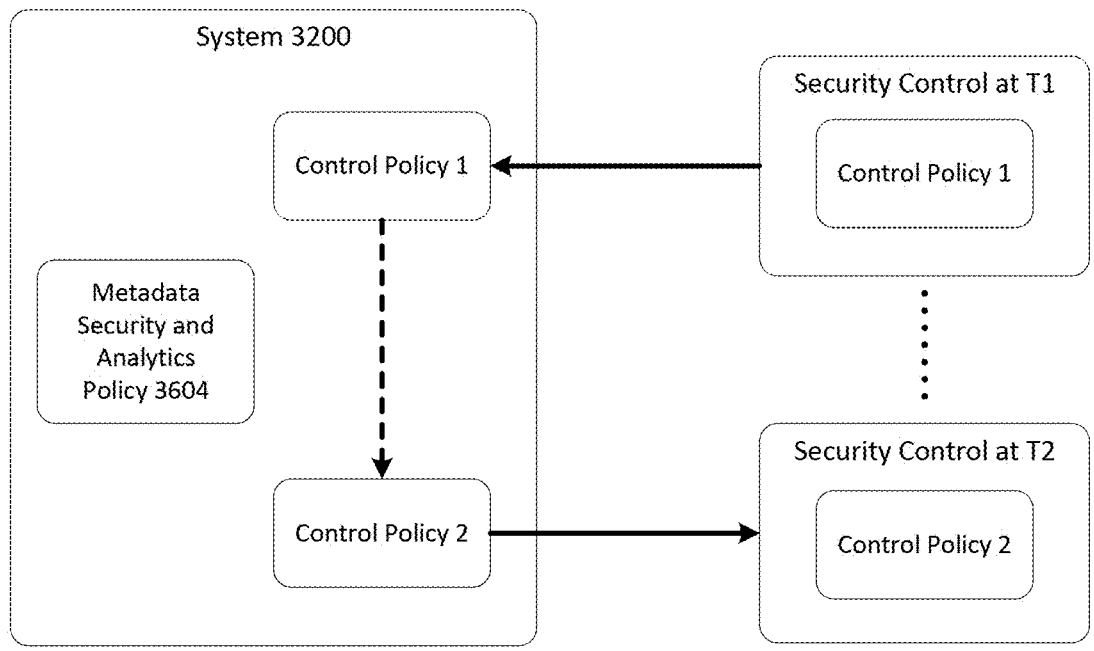
FIG. 38 shows modification of control policies and initiation of policy changes based on results from metadata analytics according to one embodiment of the present disclosure.

FIG. 38 shows modification of control policies and initiation of policy changes based on results from metadata analytics according to one embodiment of the present disclosure. For example, system 3200 collects Control Policy 1, which is associated with a security control at T1. Based on evaluation of one or more security and analytics policies 3604, Control Policy 1 is modified to provide Control Policy 2. In another embodiment, Control Policy 1 is used to create a new Control Policy 2. The modified or created Control Policy 2 is transmitted to be associated with a security control at T2.

In one embodiment, T1 and T2 correspond to states of the same security control at different times. In another embodiment, T1 and T2 correspond to the states of a set of security controls at different times.

Examples of control policies include "Power Off Vulnerable Virtual Machines" or "Quarantine Untrusted Virtual Machines". Examples of security controls include the addition or modification of firewall rules, control of virtual machine state, or the initiation of endpoint protection updates.

Figure 39:
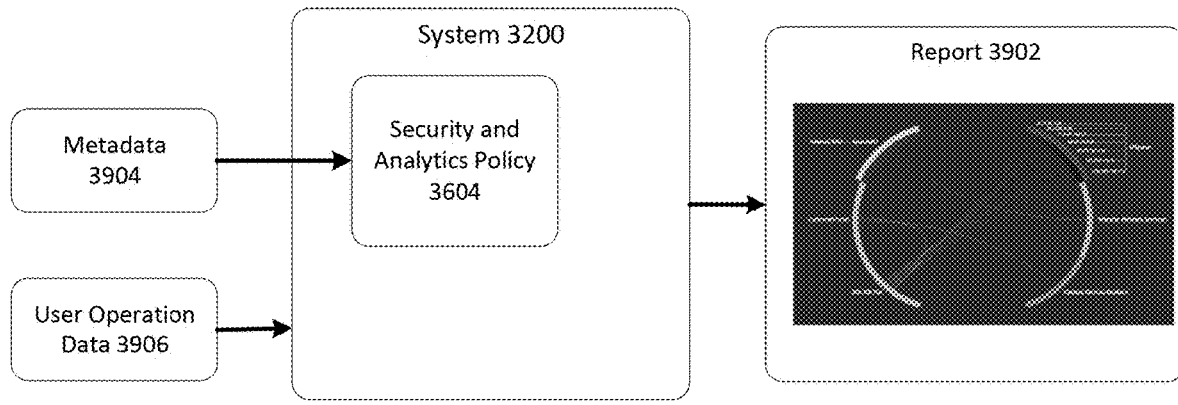
FIG. 39 shows generation of reports including visualizations of relationships between assets according to one embodiment of the present disclosure.

FIG. 39 shows generation of reports 3902 including visualizations of relationships between objects (e.g., assets) according to one embodiment of the present disclosure. In one example, the assets are in inventory repository 3204. One or more security and analytics policies 3604 are evaluated using metadata 3904. Metadata 3904 is an example of metadata 3402 of FIG. 34.

In some cases, user operation data 3906 can additionally be used by system 3200 when generating report 3902. Examples of user operation data 3906 include the filtering of objects and network flows for inclusion, or the establishment of analytic thresholds.

In one example, report 3902 presents a display in a user interface of a user computing device. In one example, report 3902 displays one or more visualizations of relationships between assets in inventory repository 3204. In one example the relationships displayed are based on metadata that has been applied to inventory 3502, as discussed above with respect to FIG. 35.

Figure 40:
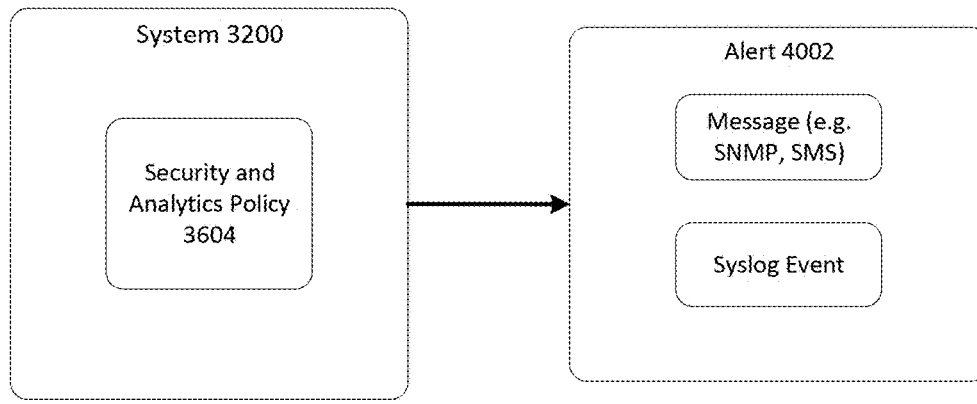
FIG. 40 shows generation of alerts based on analytics according to one embodiment of the present disclosure.

FIG. 40 shows generation of one or more alerts 4002 based on analytics according to one embodiment of the present disclosure. For example, one or more messages (e.g., SNMP or SMS messages) can be communicated to a user/operator device and/or to another computing device. For example, a system log event can be recorded in a file or database that stores other system log events.

In one example, the alerts 4002 are customized for a specific operational environment. In one example, the alerts 4002 are customized based on collected metadata and/or user operation data 3906. In one example, the alerts 4002 can be further customized based on a type and/or severity of threat.

Figure 41:
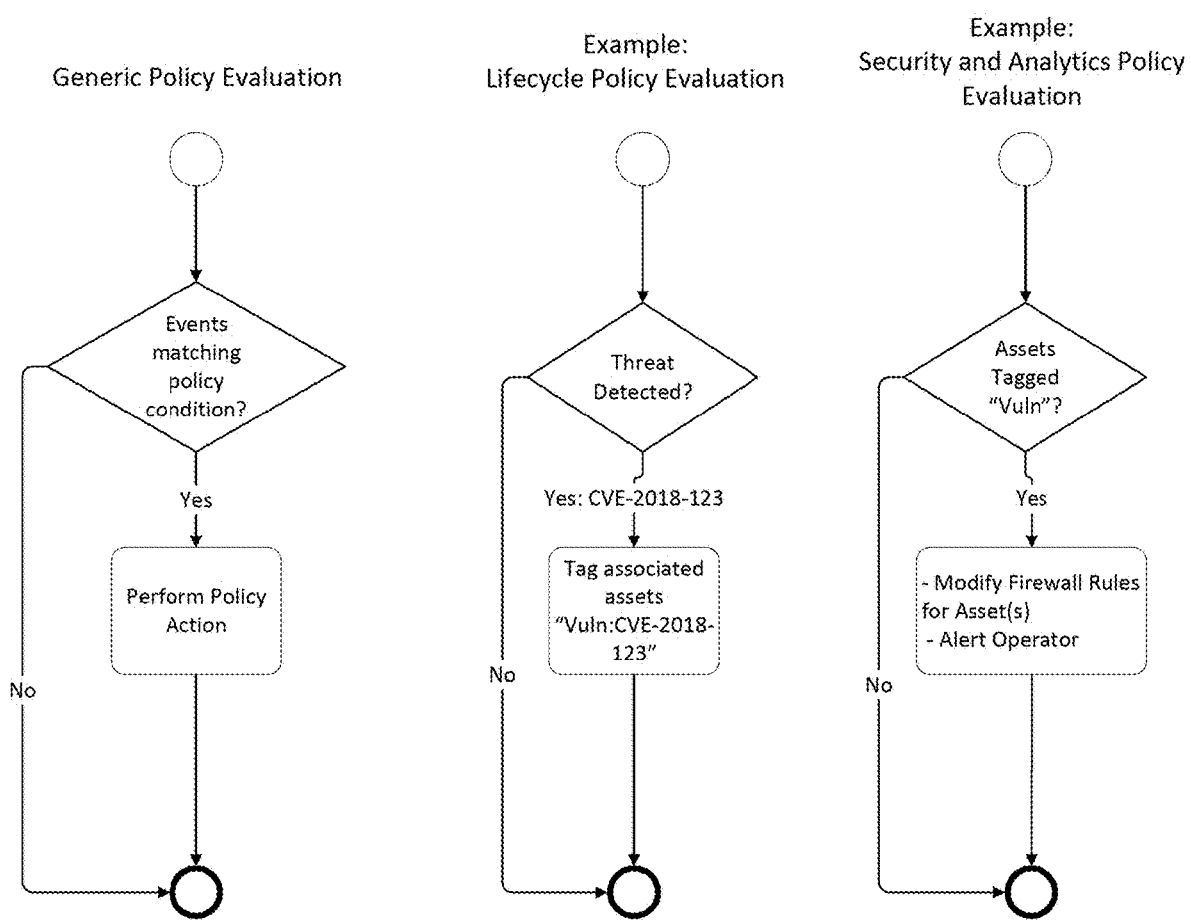
FIG. 41 shows examples of policy evaluation according to one embodiment of the present disclosure.

FIG. 41 shows examples of policy evaluation according to one embodiment of the present disclosure. In one example of a generic policy evaluation, a determination is made whether events match a policy condition. If the events match the policy condition, then a policy action is performed.

In one example of a lifecycle policy evaluation, a determination is made whether a threat is detected. If the threat is detected, then assets associated with the threat are tagged. For example, metadata is applied to objects in inventory 3502 for assets associated with the detected threat.

In one example of a security and analytics policy evaluation, a determination is made whether certain assets are tagged based on the detected threat. If it is determined that the assets are tagged, then security actions are taken. For example, firewall rules for the threatened assets are modified. For example, an operator is alerted via the user interface of a computing device that a threat for identified assets has been detected.

Figure 42:
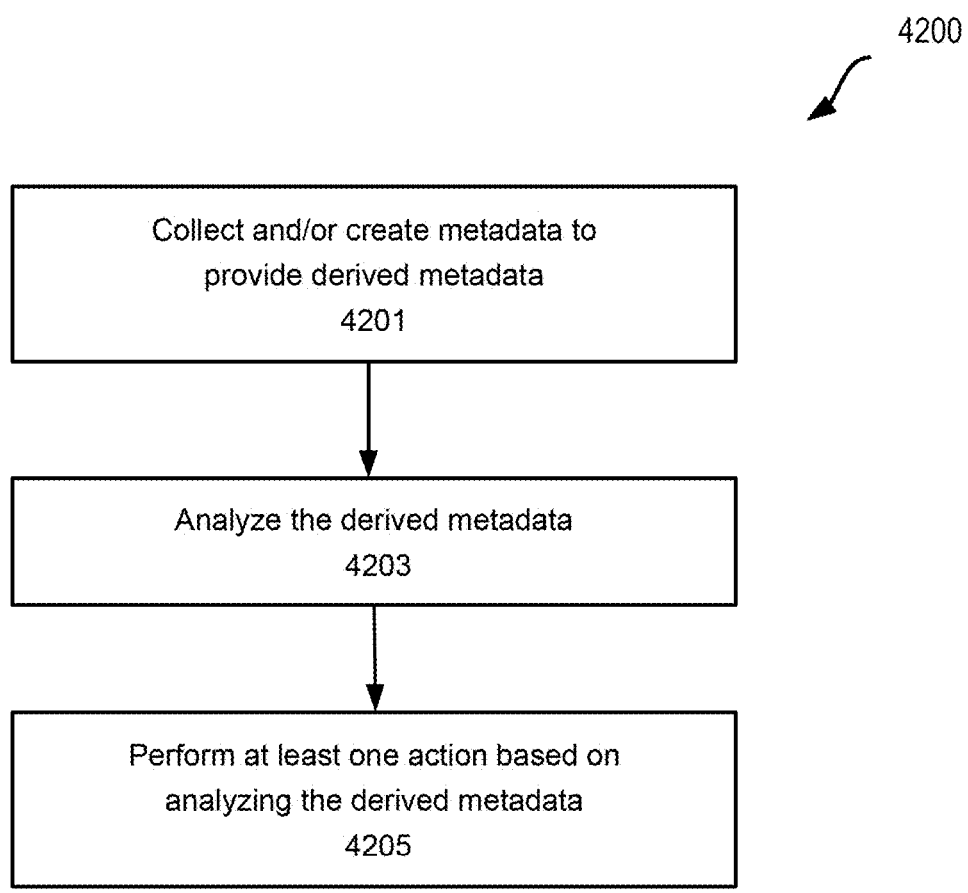
FIG. 42 is a flow diagram of an exemplary method for analyzing derived metadata according to various aspects of the present disclosure.

FIG. 42 depicts an exemplary process 4200 for analyzing derived metadata according to various embodiments of the present disclosure. At block 4201, metadata is collected and/or created to provide derived metadata. In one example, the derived metadata is derived metadata 3302. In one example, the collected metadata is collected from platform 3202.

At block 4203, the derived metadata is analyzed. For example, system 3200 analyzes the derived metadata using one or more lifecycle policies 3402. For example, each lifecycle policy 3402 is evaluated based on the derived metadata 3302.

At block 4205, at least one action is performed based on the results from analyzing the derived metadata. For example, the actions can be actions 3602, which are performed based on evaluation of security and analytics policy 3604.

The steps of process 4200 may be implemented (in whole or in part, and in any desired order) by software operating on a computer system, such as the exemplary host computing system 810 depicted in FIG. 8.

In one embodiment, a method comprises: performing, by at least one computing device (e.g., system 3200), at least one of collecting or creating metadata to provide derived metadata (e.g., derived metadata 3302); analyzing, by the at least one computing device, the derived metadata; and based on analyzing the derived metadata, performing at least one action (e.g., actions 3602).

In one embodiment, the derived metadata includes metadata collected from at least two platforms.

In one embodiment, the at least one action comprises updating or implementing at least one of a security policy or a control for at least one object, wherein the at least one object is on at least one platform, and the derived metadata includes metadata collected from the at least one platform.

In one embodiment, the at least one object comprises a virtual machine.

In one embodiment, the at least one action comprises reporting network communication flows to a computing device.

In one embodiment, reporting the network communication flows comprises presenting, based on the derived metadata, a display to a user of the computing device, wherein the display includes a graphical representation of relationships between objects on at least one platform.

In one embodiment, the method further comprises: evaluating, based on collected metadata, at least one lifecycle policy; wherein performing at least one of collecting or creating metadata comprises creating metadata based on evaluating the at least one lifecycle policy.

In one embodiment, analyzing the derived metadata comprises evaluating, based on the derived metadata, at least one security and analytics policy.

In one embodiment, performing at least one action comprises performing, based on evaluating the at least one security and analytics policy, at least one security action.

In one embodiment, the at least one security action is at least one of modifying at least one firewall rule for at least one object, sending a communication to a computing device, presenting a display to a user, implementing at least one security control, or updating at least one security control.

In one embodiment, evaluating at least one security and analytics policy comprises evaluating the presence or absence of metadata on at least one object in inventory, and performing at least one action comprises invoking at least one security action associated with the at least one object.

In one embodiment, the method further comprises, after completing the at least one security action, adding metadata to the at least one object, or removing metadata from the at least one object.

In one embodiment, the method further comprises applying the derived data to inventory on at least one platform.

In one embodiment, the method further comprises detecting a threat associated with at least one identified asset, wherein performing at least one of collecting or creating metadata comprises creating a tag associated with the detected threat, and the method further comprising applying the tag to the at least one identified asset.

Figure 43:
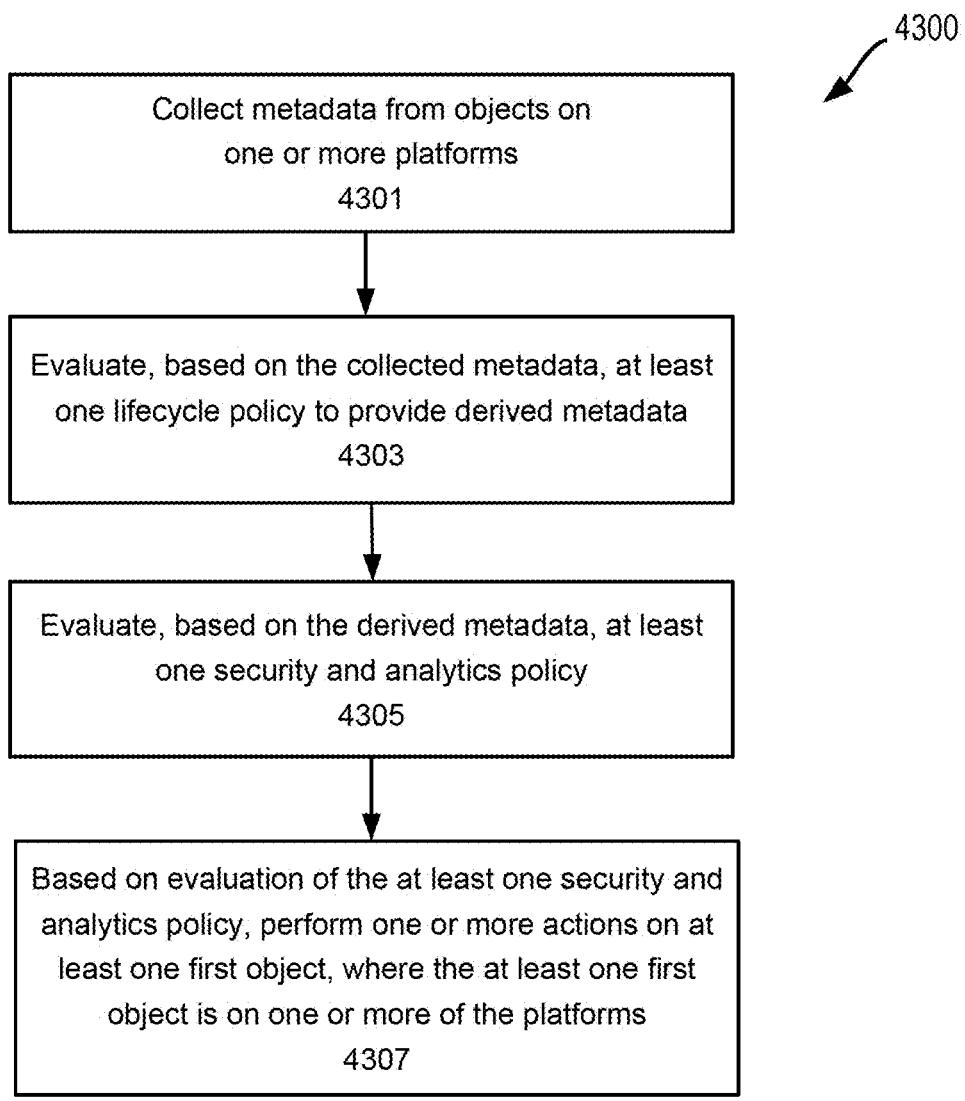
FIG. 43 is a flow diagram of an exemplary method for evaluating collected metadata using lifecycle policies, and evaluating derived metadata using security and analytics policies, according to various aspects of the present disclosure.

FIG. 43 depicts an exemplary process 4300 for evaluating collected metadata using lifecycle policies, and evaluating derived metadata using security and analytics policies, according to various embodiments of the present disclosure. At block 4301, metadata is collected from objects on one or more platforms. For example, metadata 3402 is collected from platform 3202 by system 3200.

At block 4303, based on the collected metadata, one or more lifecycle policies are evaluated to provide derived metadata. For example, lifecycle policies 3402 are evaluated based on collected metadata 3402 in order to provide derived metadata 3302.

At block 4305, based on the derived metadata, one or more security and analytics policies are evaluated. For example, security and analytics policies 3604 are evaluated based on derived metadata 3302 that has been applied to inventory 3502.

At block 4307, based on evaluation of the one or more security and analytics policies, one or more actions are performed on one or more objects. The objects are on one or more of the platforms from which metadata was collected at block 4301. For example, actions 3602 are performed based on evaluation of security and analytics policies 3604.

The steps of process 4300 may be implemented (in whole or in part, and in any desired order) by software operating on a computer system, such as the exemplary host computing system 810 depicted in FIG. 8.

In one embodiment, a system (e.g., system 3200) comprises: at least one processor; and memory in communication with the at least one processor and storing instructions that, when executed by the at least one processor, cause the system to: collect metadata (e.g., metadata 3402) from objects on at least one platform (e.g., platform 3202); evaluate, based on the collected metadata, at least one lifecycle policy (e.g., lifecycle policy 3402) to provide derived metadata (e.g., derived metadata 3302); evaluate, based on the derived metadata, at least one security and analytics policy (e.g., security and analytics policy 3604); and based on evaluation of the at least one security and analytics policy, perform at least one action (e.g., actions 3602) on at least one first object, wherein the at least one first object is on the at least one platform.

In one embodiment, the instructions further cause the system to: collect, from the at least one platform using an API query, inventory data regarding each of the objects, wherein the inventory data uniquely identifies each object on the at least one platform; and based on the at least one lifecycle policy, apply the derived metadata to each of the objects, wherein applying the derived metadata comprises updating the inventory data for each object.

In one embodiment, the instructions further cause the system to transmit, based on evaluation of the at least one security and analytics policy, an alert, wherein the alert includes an identification of a detected threat and an associated object.

In one embodiment, the instructions further cause the system to: receive a first control policy from a security control on a first platform; and update the at least one security and analytics policy to include the first control policy.

In one embodiment, the collected metadata includes data inventory attributes, a state, or data received over a network from at least one computing device.

In one embodiment, evaluating the at least one lifecycle policy comprises determining whether a condition is satisfied by a second object, and providing derived metadata includes creating metadata for the second object in response to satisfying the condition.

Closing

The functionality of various embodiments may be performed via a web browser and/or application interfacing utilizing a web browser. Such browser applications may comprise Internet browsing software installed within a computing unit or a system to perform various functions. These computing units or systems may take the form of a computer or set of computers, and any type of computing device or systems may be used, including laptops, notebooks, tablets, hand held computers, personal digital assistants, set-top boxes, workstations, computer-servers, main frame computers, mini-computers, PC servers, pervasive computers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, or any other of the myriad software packages available for browsing the internet.

Various embodiments may operate in conjunction with any suitable operating system (e.g., Windows NT, 95/98/2000/CE/Mobile, OS2, UNIX, Linux, Solaris, MacOS, PalmOS, etc.) as well as various conventional support software and drivers typically associated with computers. Various embodiments may include any suitable personal computer, network computer, workstation, personal digital assistant, cellular phone, smart phone, minicomputer, mainframe or the like. Embodiments may implement security protocols, such as Secure Sockets Layer (SSL), Transport Layer Security (TLS), and Secure Shell (SSH). Embodiments may implement any desired application layer protocol, including http, https, ftp, and sftp.

Various components, modules, and/or engines may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems may utilize TCP/IP communications protocols as well as IPX, Appletalk, IP-6, NetBIOS, OSI, any tunneling protocol (e.g. IPsec, SSH), or any number of existing or future protocols. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, satellite networks, ISDN, Digital Subscriber Line (DSL), or various wireless communication methods. It is noted that the network may be implemented as other types of networks, such as an interactive television (ITV) network.

The system may be partially or fully implemented using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Embodiments may connect to the Internet or an intranet using standard dial-up, cable, DSL or any other Internet protocol known in the art. Transactions may pass through a firewall in order to prevent unauthorized access from users of other networks.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A computer-implemented method comprising:
    collecting, by at least one computing device, metadata, the metadata comprising attributes of one or more platforms;
    evaluating, based on the collected metadata, at least one lifecycle policy, the lifecycle policy controlling at least one of the collecting of the metadata or a transformation of the metadata;
    providing derived metadata based on the evaluating of the at least one lifecycle policy, the derived metadata determined based on the lifecycle policy;
    analyzing, by the at least one computing device, the derived metadata; and
    based on analyzing the derived metadata, performing at least one action;
    wherein the at least one action comprises updating or implementing at least one of a security policy or a control for at least one object, wherein the at least one object is on at least one platform, wherein the derived metadata includes metadata collected from the at least one platform, and wherein the at least one object comprises a virtual machine.

2. The method of claim 1, wherein the derived metadata includes metadata collected from at least two platforms.

3. The method of claim 1, wherein the at least one action further comprises reporting network communication flows to a computing device.

4. The method of claim 3, wherein reporting the network communication flows comprises presenting, based on the derived metadata, a display to a user of the computing device, and wherein the display includes a graphical representation of relationships between objects on the at least one platform.

5. The method of claim 1, wherein analyzing the derived metadata comprises evaluating, based on the derived metadata, at least one security and analytics policy.

6. The method of claim 5, wherein the at least one action further comprises performing, based on evaluating the at least one security and analytics policy, at least one security action.

7. The method of claim 6, wherein the at least one security action is at least one of modifying at least one firewall rule for at least one object, sending a communication to a computing device, presenting a display to a user, implementing at least one security control, or updating at least one security control.

8. The method of claim 5, wherein evaluating at least one security and analytics policy comprises evaluating a presence or absence of metadata on at least one object in inventory, and wherein the at least one action further comprises invoking at least one security action associated with the at least one object.

9. The method of claim 8, further comprising, after completing the at least one security action, adding metadata to the at least one object, or removing metadata from the at least one object.

10. The method of claim 1, further comprising applying the derived metadata to inventory on the at least one platform.

11. The method of claim 1, further comprising detecting a threat associated with at least one identified asset, wherein performing at least one of collecting or creating metadata comprises creating a tag associated with the detected threat, and the method further comprising applying the tag to the at least one identified asset.

12. The method of claim 1, wherein the collecting metadata comprises collecting the metadata from the one or more platforms, and wherein the one or more platforms are selected from the group consisting of: a virtual machine (VM), a hypervisor, a cloud, and a container platform.

13. A system comprising:

at least one processor; and memory in communication with the at least one processor and storing instructions that, when executed by the at least one processor, cause the system to:

collect metadata from objects on at least one platform;

evaluate, based on the collected metadata, at least one lifecycle policy to provide derived metadata, the lifecycle policy controlling at least one of the collecting of the metadata or a transformation of the metadata, the derived metadata determined based on the lifecycle policy;

evaluate, based on the derived metadata, at least one security and analytics policy; and based on evaluation of the at least one security and analytics policy, perform at least one action on at least one first object, wherein the at least one first object is on the at least one platform;

wherein the at least one action comprises updating or implementing at least one of a security policy or a control for the at least one first object, wherein the derived metadata includes metadata collected from the at least one platform, and wherein the at least one first object comprises a virtual machine.

14. The system of claim 13, wherein the instructions further cause the system to:

collect, from the at least one platform using an API query, inventory data regarding each of the objects, wherein the inventory data uniquely identifies each object on the at least one platform; and based on the at least one lifecycle policy, apply the derived metadata to each of the objects, wherein applying the derived metadata comprises updating the inventory data for each object.

15. The system of claim 14, wherein the instructions further cause the system to transmit, based on evaluation of the at least one security and analytics policy, an alert, wherein the alert includes an identification of a detected threat and an associated object.

16. The system of claim 13, wherein the instructions further cause the system to:

receive a first control policy from a security control on a first platform; and update the at least one security and analytics policy to include the first control policy.

17. The system of claim 13, wherein the collected metadata includes data inventory attributes, a state, or data received over a network from at least one computing device.

18. The system of claim 13, wherein evaluating the at least one lifecycle policy comprises determining whether a condition is satisfied by a second object, and wherein providing the derived metadata includes creating the metadata for the second object in response to satisfying the condition.

* * * * *